US012197151B2

(12) United States Patent
Samei et al.

(10) Patent No.: US 12,197,151 B2
(45) Date of Patent: Jan. 14, 2025

(54) HEATING DEVICE, FIXING DEVICE, AND IMAGE FORMING APPARATUS

(71) Applicants: Masahiro Samei, Kanagawa (JP); Takayuki Andoh, Kanagawa (JP); Kota Shiodera, Tokyo (JP); Hiroshi Yoshinaga, Chiba (JP); Toshiyuki Kabata, Kanagawa (JP)

(72) Inventors: Masahiro Samei, Kanagawa (JP); Takayuki Andoh, Kanagawa (JP); Kota Shiodera, Tokyo (JP); Hiroshi Yoshinaga, Chiba (JP); Toshiyuki Kabata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/225,158

(22) Filed: Jul. 24, 2023

(65) Prior Publication Data

US 2024/0036500 A1 Feb. 1, 2024

(30) Foreign Application Priority Data

Aug. 1, 2022 (JP) ................................ 2022-122656

(51) Int. Cl.
*G03G 15/20* (2006.01)

(52) U.S. Cl.
CPC ..... *G03G 15/2017* (2013.01); *G03G 15/2064* (2013.01); *G03G 2215/2035* (2013.01)

(58) Field of Classification Search
CPC ........... G03G 15/2017; G03G 15/2039; G03G 15/2042; G03G 15/2053; G03G 2215/2003
See application file for complete search history.

(56) References Cited

U.S. PATENT DOCUMENTS

2013/0183072 A1 7/2013 Hase et al.
2014/0072355 A1 3/2014 Tamaki et al.
(Continued)

FOREIGN PATENT DOCUMENTS

JP 2013-164430 A 8/2013
JP 2013-164453 A 8/2013
(Continued)

OTHER PUBLICATIONS

U.S. Appl. No. 18/160,080, filed Jan. 26, 2023.
(Continued)

*Primary Examiner* — Thomas S Giampaolo, II
(74) *Attorney, Agent, or Firm* — XSENSUS LLP

(57) ABSTRACT

A heating device includes a rotator, a heater, a rotator holder, lubricant, and a shield. The heater heats the rotator in a heat generation range. The rotator holder holds an end of the rotator in a longitudinal direction of the rotator. The lubricant adheres to the rotator holder. The shield shields heat transferred from the heater. The shield includes a first shield, a second shield, and a heat transfer reducer. The first shield faces the heater and the rotator. The second shield faces the rotator holder. The second shield is outside the heat generation range in the longitudinal direction. The heat transfer reducer is disposed between the first shield and the second shield. The heat transfer reducer reduces the heat transferred from the first shield to the second shield.

19 Claims, 10 Drawing Sheets

(56) References Cited

U.S. PATENT DOCUMENTS

| | | | | |
|---|---|---|---|---|
| 2014/0341623 | A1 | 11/2014 | Arai et al. | |
| 2014/0341624 | A1* | 11/2014 | Arai .................. | G03G 15/2053 399/329 |
| 2021/0041811 | A1* | 2/2021 | Shimada ............ | G03G 15/2025 |

FOREIGN PATENT DOCUMENTS

| | | | |
|---|---|---|---|
| JP | 2014-056007 | A | 3/2014 |
| JP | 2014-056016 | A | 3/2014 |
| JP | 2014-240945 | A | 12/2014 |
| JP | 2015-069026 | A | 4/2015 |
| JP | 2015-203719 | A | 11/2015 |
| JP | 2020-134916 | A | 8/2020 |

OTHER PUBLICATIONS

U.S. Appl. No. 18/179,552, filed Mar. 7, 2023.
U.S. Appl. No. 18/176,845, filed Mar. 1, 2023.
U.S. Appl. No. 18/163,591, filed Feb. 2, 2023.
U.S. Appl. No. 18/185,778, filed Mar. 17, 2023.
U.S. Appl. No. 18/136,879, filed Apr. 20, 2023.
U.S. Appl. No. 18/207,153, filed Jun. 8, 2023.
U.S. Appl. No. 18/180,509, filed Mar. 8, 2023.
U.S. Appl. No. 18/162,872, filed Feb. 1, 2023.

* cited by examiner

HEATING DEVICE, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-122656, filed on Aug. 1, 2022, in the Japan Patent Office, the entire disclosure of which is hereby incorporated by reference herein.

BACKGROUND

Technical Field

Embodiments of the present disclosure relate to a heating device, a fixing device, and an image forming apparatus.

Related Art

One type of image forming apparatus such as a copier or a printer includes a fixing device that is a heating device heating a recording medium such as a sheet bearing an unfixed image to fix the unfixed image onto the recording medium.

Such a fixing device includes a pair of rotators contacting each other and a heater heating at least one of the rotators. The sheet passes through a nip in which the pair of rotators contact each other, and heat and pressure in the nip fix the unfixed image onto the sheet. In a heating device such as the fixing device, lubricant such as oil or grease is typically used to smoothly rotate the rotator.

SUMMARY

This specification describes an improved heating device that includes a rotator, a heater, a rotator holder, lubricant, and a shield. The heater heats the rotator in a heat generation range. The rotator holder holds an end of the rotator in a longitudinal direction of the rotator. The lubricant adheres to the rotator holder. The shield shields heat transferred from the heater. The shield includes a first shield, a second shield, and a heat transfer reducer. The first shield faces the heater and the rotator. The second shield faces the rotator holder. The second shield is outside the heat generation range in the longitudinal direction. The heat transfer reducer is disposed between the first shield and the second shield. The heat transfer reducer reduces the heat transferred from the first shield to the second shield.

This specification also describes an image forming apparatus including the heating devices.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
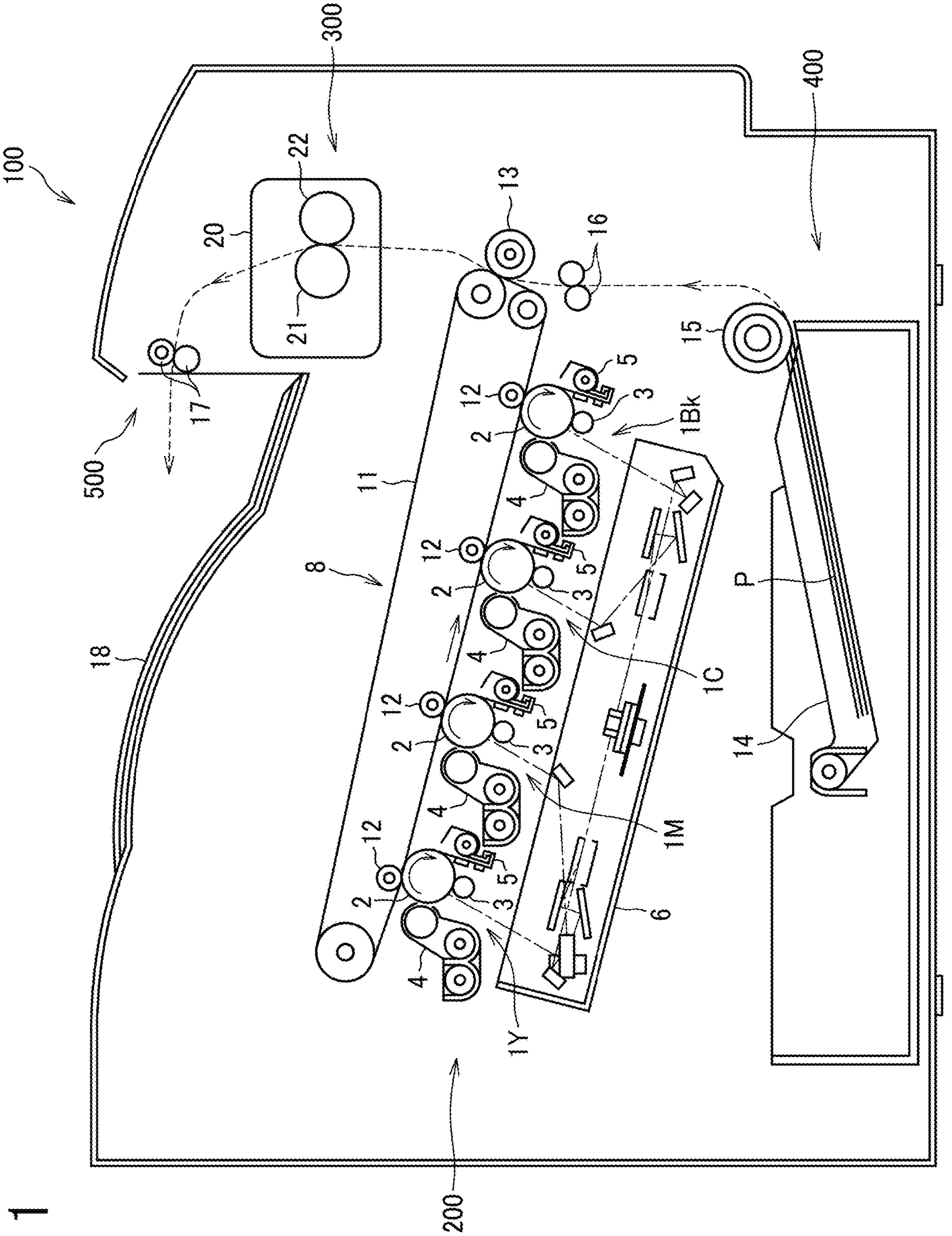
FIG. 1 is a schematic cross-sectional view of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity, However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context dearly indicates otherwise.

With reference to drawings, descriptions are given below of embodiments of the present disclosure. In the drawings for illustrating embodiments of the present disclosure, elements or components identical or similar in function or shape are given identical reference numerals as far as distinguishable, and redundant descriptions are omitted.

FIG. 1 is a schematic cross-sectional view of an image forming apparatus 100 according to an embodiment of the present disclosure. In the following description, the “image forming apparatus” includes a printer, a copier, a facsimile machine, or a multifunction peripheral having at least two of printing, copying, scanning, and facsimile functions, The term “image formation” indicates an action for providing (i.e., printing) not only an image having a meaning, such as texts and figures on a recording medium, but also an image having no meaning, such as patterns on the recording medium. Initially, with reference to FIG. 1, a description is given of an overall configuration and operation of the image forming apparatus 100 according to the embodiment of the present disclosure.

As illustrated in FIG. 1, the image forming apparatus 100 according to the present embodiment includes an image forming section 200 to form an image on a sheet-shaped recording medium such as a sheet, a fixing section 300 to fix the image onto the recording medium, a recording medium feeder 400 to feed the recording medium to the image forming, section 200, and a recording medium ejection section 500 to eject the recording medium to an outside of the image forming apparatus 100.

The image forming section 200 includes four process units 1Y, 1M, 1C, and 1Bk as image forming units, an exposure device 6 to form an electrostatic latent image on a photoconductor 2 in each of the process units 1Y, 1M, 1C, and 1Bk, and a transfer device 8 to transfer an image onto the recording medium.

The process units 1Y, 1M, 1C, and 1Bk have the same configuration except for containing different color toners (developers), i.e., yellow (Y), magenta (M), cyan (C), and black (Bk) toners, respectively, corresponding to decomposed color separation components of full-color images. Specifically, each of the process units 1Y, 1M, 1C, and 1Bk includes the photoconductor 2 serving as an image bearer bearing the image on the surface thereof, a charger 3 to charge the surface of the photoconductor 2, a developing device 4 to supply the toner as the developer to the surface of the photoconductor 2 to form a toner image, and a cleaner 5 to clean the surface of the photoconductor 2.

The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside the loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip.

The fixing section 300 includes a fixing device 20 as a heating device that hearts the recording medium bearing the transferred image. The fixing device 20 includes a fixing belt 21 and a pressure roller 22. The fixing belt 21 heats the image on the recording medium. The pressure roller 22 contacts the fixing belt 21 to form an area of contact, called a fixing nip, between the fixing belt 21 and the pressure roller 22.

The recording medium feeder 400 includes a sheet tray 14 to store sheets P as recording media and a feed roller 15 to feed the sheet P from the sheet tray 14. Although a “recording medium” is described as a “sheet of paper” (simply referred to as “sheet”) in the following embodiments, the “recording medium” is not limited to the sheet of paper. Examples of the “recording medium” include not only the sheet of paper but also an overhead projector (OHP) transparency sheet, a fabric, a metallic sheet, a plastic film, and a prepreg sheet including carbon fibers previously impregnated with resin. Examples of the “sheet” include thick paper, a postcard, an envelope, thin paper, coated paper (e.g., coat paper and art paper), and tracing paper, in addition to plain paper.

The recording medium ejection section 500 includes an output roller pair 17 to eject the sheet P to the outside of the image forming apparatus 100 and an output tray 18 to place the sheet P ejected by the output roller pair 17.

To provide a fuller understanding of the embodiments of the present disclosure, a description is now given of printing operations of the image forming apparatus 100 according to the present embodiment, with continued reference to FIG. 1.

When the image forming apparatus 100 starts the printing operations, the photoconductors 2 of the process units 1Y, 1M, 1C, and 1Bk and the intermediate transfer belt 11 of the transfer device 8 start rotating. The feed roller 15 starts rotating to feed the sheet P from the sheet tray 14. The sheet P fed from the sheet tray 14 is brought into contact with a timing roller pair 16 and temporarily stopped until the image forming section 200 forms the image to be transferred to the sheet P.

In each of the process units 1Y, 1M, 1C, and 1Bk, the charger 3 uniformly charges the surface of the photoconductor 2 at a high electric potential. According to image data of a document read by a document reading device or print data instructed to print by a terminal, the exposure device 6 exposes the charged surface of each of the photoconductors 2. As a result, the electric potential at an exposed portion on the surface of each of the photoconductors 2 is decreased. Thus, an electrostatic latent image is formed on the surface of each of the photoconductors 2. The developing device 4 supplies toner to the electrostatic latent image formed on the photoconductor 2, forming the toner image thereon. When the toner images formed on the photoconductors 2 reach the primary transfer nips defined by the primary transfer rollers 12 with the rotation of the photoconductors 2, the toner images formed on the photoconductors 2 are transferred onto the intermediate transfer belt 11 rotated counterclockwise in FIG. 1 successively such that the toner images are superimposed on the intermediate transfer belt 11, forming a full color toner image thereon. Thus, the full color toner image is formed on the intermediate transfer belt 11. The image forming apparatus 100 can form a monochrome toner image by using any one of the four process units 1Y, 1M, 1C, and 1Bk, or can form a bicolor toner image or a tricolor toner image by using two or three of the process units 1Y, 1M, 1C, and 1Bk. After the toner image is transferred to the intermediate transfer belt 11, the cleaner 5 removes residual toner that are remained on the photoconductor 2 from the surface of the photoconductor 2.

In accordance with rotation of the intermediate transfer belt 11, the toner image transferred onto the intermediate transfer belt 11 is conveyed to the secondary transfer nip (the position of the secondary transfer roller 13) and is transferred onto the sheet P conveyed by the timing roller pair 16. The sheet P bearing the toner image is conveyed to the fixing device 20. In the fixing device 20, the fixing belt 21 and the pressure roller 22 apply heat and pressure to the toner image on the sheet P to fix the toner image onto the sheet P. Then, the sheet P bearing the fixed toner image is conveyed to the recording medium ejection section 500. In the recording medium ejection section 500, the output roller pair 17 ejects the sheet P onto the output tray 18. Thus, a series of printing operations is completed.

Figure 2:
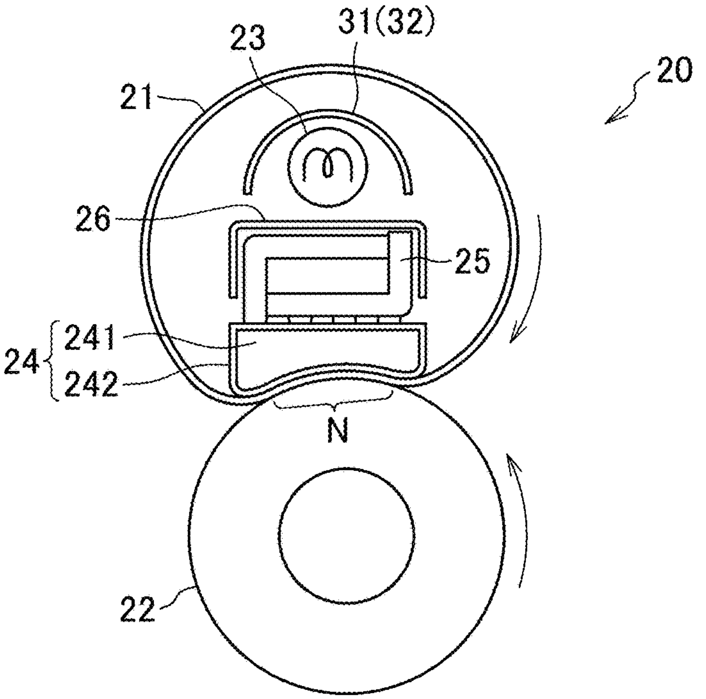
FIG. 2 is a schematic cross-sectional view of a fixing device according to a first. embodiment of the present disclosure in a cross-section orthogonal to a longitudinal direction of the fixing device.
Figure 3:
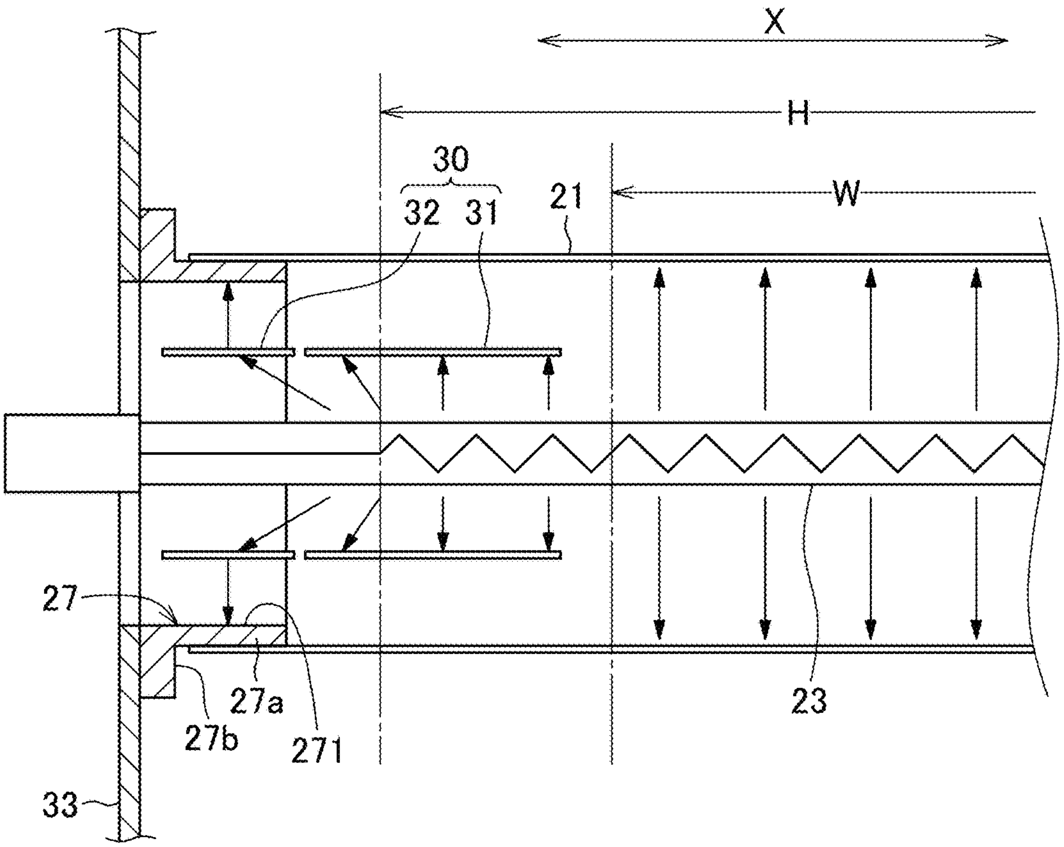
FIG. 3 is a cross-sectional view of an end portion of the fixing device of FIG. 2, taken along a longitudinal direction of a fixing belt included in the fixing device.

Next, with reference to FIGS. 2 and 3, a description is given of a basic configuration of the fixing device 20 according to the present embodiment. FIG. 2 is a cross-sectional view of an end portion of the fixing device according to the present embodiment, viewed in a longitudinal direction of the fixing belt 21. FIG. 3 is a cross-sectional view of the end portion of the fixing device, taken along the longitudinal direction. The above-described "longitudinal direction" of the fixing belt 21 is a direction indicated by two-headed arrow X in FIG. 3, along a rotation axis direction of the pressure roller 22 or a width direction of the sheet P passing through the fixing nip between the fixing belt 21 and the pressure roller 22. The width direction of the sheet P is a direction intersecting a sheet conveyance direction in which the sheet P is conveyed. In the following direction, the longitudinal direction of the fixing belt 21 may be referred to as the longitudinal direction.

As illustrated in FIG. 2, the fixing device 20 according to the present embodiment includes a heater 23, a nip formation pad 24, a stay 25, a reflector 26, a belt holder 27 (see FIG. 3), a first heat shield plate 31, and a second heat shield plate 32 in addition to the fixing belt 21 and pressure roller 22. These members extend in the longitudinal direction.

The fixing belt 21 is a rotator (specifically, a first rotator or a fixing rotator) that contacts a surface of the sheet P bearing unfixed toner to fix the unfixed toner or unfixed image onto the sheet P.

The fixing belt 21 is an endless belt including a base layer, an elastic layer, and a release layer successively layered from the inner circumferential surface to the outer circumferential surface. The base has a thickness of 30 μm to 50 μm and is made of metal such as nickel or stainless steel or resin such as polyimide. The elastic layer has a thickness of 100 μm to 300 μm and is made of rubber such as silicone rubber, silicone rubber form, or fluorine rubber. The elastic layer of the fixing belt 21 eliminates slight surface asperities of the fixing belt 21 at the fixing nip, thus facilitating uniform conduction of heat to the toner image on the sheet P. The release layer of the fixing belt 21 has a thickness of 10 μm to 50 μm and is made of, for example, tetrafluoroethylene-perfluoroalkylvinylether copolymer (PFA), polytetrafluoroethylene (PTFE), polyimide, polyetherimide, or polyether sulfide (PES). The release layer of the fixing belt 21 facilitates the separation of toner contained in the toner image on the sheet P from the fixing belt 21. In other words, the release layer of the fixing belt 21 facilitates the release of the toner from the fixing belt 21. To reduce the size and thermal capacity of the fixing belt 21, the fixing belt 21 preferably has a total thickness equal to or less than 1 mm and a loop diameter equal to or less than 30 mm.

The pressure roller 22 is a rotator (specifically, a second rotator or counter rotator) disposed to face the outer circumferential surface of the fixing belt 21. Specifically, the pressure roller 22 includes a solid iron core, an elastic layer on an outer circumferential surface of the core, and a release layer resting on an outer circumferential surface of the elastic layer. The core may be hollow. The elastic layer is made of, for example, silicone rubber, silicone rubber form, or fluorine rubber. The release layer is made of a fluororesin such as PFA or PTFE.

The heater 23 heats the fixing belt 21. In the present embodiment, a halogen heater is used as the heater 23. Instead of the halogen heater, the heater 23 may be another radiant heater such as a carbon heater or a ceramic heater. The fixing device 20 according to the present embodiment includes one heater 23 inside the loop of the fixing belt 21 but may include multiple heaters 23.

The nip formation pad 24 is disposed inside the loop of the fixing belt 21. The nip formation pad 24 forms a nip N between the fixing belt 21 and the pressure roller 22 under pressure from the pressure roller 22. The nip formation pad 24 includes a base pad 241 and a sliding sheet 242.

The base pad 241 extends in the longitudinal direction X of the fixing belt 21 and is fixed to the stay 25. The base pad 241 receives a pressing force from the pressure roller 22 and determines a shape of the nip N. The base pad 241 is preferably made of a heat-resistant material having a heat-resistant temperature of not less than 200° C. For example, the base pad 241 is made of a typical heat-resistant resin such as polyether sulfone (PES), polyphenylene sulfide (PPS), liquid crystal polymer (LCP), polyether nitrile (PEN), polyamide-imide (PAI), or polyether ether ketone (PEEK). The base pad 241 made of such a heat-resistant material prevents the thermal deformation of the base pad 241 in a fixing temperature range and stabilizes the shape of the nip N. Although FIG. 2 illustrates the nip N having a concave shape, the nip N may be flat or have another shape.

The sliding sheet 242 is a low-friction member interposed between the base pad 241 and the inner circumferential surface of the fixing belt 21 and is made of fluororesin in the present embodiment. The sliding sheet 242 interposed between the base pad 241 and the fixing belt 21 reduces the sliding resistance of the fixing belt 21 with respect to the base pad 241. In a case where the base pad 241 is a low-friction pad, the sliding sheet 242 may be omitted.

The stay 25 is a support supporting the nip formation pad 24 toward the pressure roller 22. The stay 25 supporting the nip formation pad 24 prevents the bending of the nip formation pad 24 (in particular, bending throughout the length of the fixing belt 21) under pressure from the pressure roller 22. Such a configuration results in a uniform width of the nip N in the longitudinal direction. The stay 25 is preferably made of iron-based metal such as steel use stainless (SUS) or steel electrolytic cold commercial (SECC) to enhance the rigidity.

The reflector 26 reflects radiant heat (infrared rays emitted from the heaters 23.

The reflector 26 reflects, to the fixing belt 21, the radiant heat emitted from the heaters 23 to efficiently heat the fixing belt 21. As the reflector 26 is interposed between the stay 25 and the heaters 23, the reflector 26 also prevents heat conduction to the stay 25. The reflector 26 thus prevents the flow of heat to a component that does not directly contribute to fixing, to enhance the efficiency of energy consumption. The reflector 26 is made of, for example, metal such as aluminum or stainless steel. In particular, the reflector 26 including an aluminum base with a surface on which silver having a relatively high reflectance is deposited by vapor deposition further enhances the heating efficiency.

The belt holders 27 are a pair of rotator holders that holds the fixing belt 21 such that the fixing belt 21 can rotate. In other words, the fixing belt 21 is rotatably held by the belt holders 27. As illustrated in FIG. 3, the belt holders 27 are inserted into the loop formed by the fixing belt 21 at both end portions of the fixing belt 21 in the longitudinal direction to hold the inner side of the fixing belt 21 such that the fixing belt 21 can slidably rotate. Both end portions of the fixing belt 21 in the longitudinal direction described above are not limited to both edges of the fixing belt 21, which are the most ends in the longitudinal direction of the fixing belt 21. Similarly, an "end portion" of the fixing belt 21 in the longitudinal direction, which is described below, is not limited to a longitudinal edge of the fixing belt 21, which is the most end in the longitudinal direction of the fixing belt 21. The end portion of the fixing belt 21 in the longitudinal direction includes, in addition to the longitudinal edge of the fixing belt 21, a position within a range of one-third length from the longitudinal edge outside a minimum sheet conveyance area of the fixing belt 21 in the longitudinal direction of the fixing belt 21 when the fixing belt 21 is equally divided into three in the longitudinal direction of the fixing belt 21. Note that the minimum sheet conveyance area is an area in which a minimum sheet P is conveyable.

Accordingly, the belt holder 27 may hold a portion of the fixing belt 21 that is not the longitudinal edge of the fixing belt 21 as the end portion of the fixing belt 21 in addition to the longitudinal edge of the fixing belt 21.

Specifically, the belt holder 27 includes an insertion 27*a* and a restraint 27*b*. As illustrated in FIG. 3, the insertion 27*a* has a C-shaped cross-section and is inserted into the longitudinal end portion of the fixing belt 21, and the restraint 27*b* has an outer diameter greater than that of the insertion 27*a*. The restraint 27*b* has an outer diameter greater than that of at least the fixing belt 21 to restrain the deviation or movement of the fixing belt 21 in the longitudinal direction X. The insertion 27*a* is inserted into the longitudinal end portion of the fixing belt 21 to hold the inner side of the fixing belt 21 such that the fixing belt 21 can rotate. The belt holder 27 is made of resin having high heat resistance, such as Poly Ether Ether Ketone (PEEK), Poly Phenylene Sulfide (PPS), Liquid Crystal Polymer (LCP), or Poly Ethylene Terephthalate (PET).

As illustrated in FIG. 2, the first heat shield plate 31 and the second heat shield plate 32 extend in the circumferential direction of the fixing belt 21. As illustrated in FIG. 3, the first heat shield plate 31 is disposed between the heater 23 and the end portion of the fixing belt 21 in the longitudinal direction X. The second heat shield plate 32 is disposed between the belt holder 27 and the heater 23. Although only one end portion of the fixing belt 21 in the longitudinal direction X is illustrated in FIG. 3, the belt holder 27, the first heal shield plate 31, and the second heat shield plate 32 are similarly disposed around the other end portion of the fixing belt 21.

The fixing device 20 configured as described above operates as follows. A driver in the body of the image forming apparatus drives and rotates the pressure roller 22 in a direction indicated by an arrow in FIG. 2, and the rotation of the pressure roller 22 rotates the fixing belt 21. The heater 23 generates heat to heat the fixing belt 21. After the temperature of the fixing belt 21 reaches the fixing temperature, the sheet P bearing the unfixed image passes through the nip N between the fixing belt 21 and the pressure roller 22, and the fixing belt 21 and the pressure roller 22 apply heat and pressure to the sheet P to fix the image onto the sheet P.

In the above-described fixing device including the nip formation pad 24, rotating the fixing belt 21 results in sliding the fixing belt 21 on the nip formation pad 24, which generates sliding resistance between the fixing belt 21 and the nip formation pad 24. To reduce the sliding resistance, typically, lubricant such as silicone oil or fluorine grease is applied between the fixing belt 21 and the nip formation pad 24. For example, the sliding sheet 242 containing the lubricant is disposed between the base pad 241 of the nip formation pad 24 and the inner circumferential surface of the fixing belt 21, and the lubricant oozes out from the sliding sheet 242 to be interposed between the nip formation pad 24 and the fixing belt 21.

In the above-described configuration including the pair of belt holders 27 holding the fixing belt 21, rotating the fixing belt 21 results in sliding the fixing belt 21 on each of the belt holders 27. Sliding the fixing belt 21 on the belt holder generates the sliding resistance between each of the belt holders 27 and the fixing belt 21. To reduce the sliding resistance, the lubricant as described above is also interposed between each of the belt holders 27 and the fixing belt 21.

In the above-described configuration including a member on which the fixing belt 21 slides, such as the nip formation pad 24 and the belt holders 27, the lubricant such as silicone oil or fluorine grease is used to enhance a sliding performance of the fixing belt 21. However, the lubricant includes components that are volatilized by a temperature rise in the fixing device, such as a component having a low molecular weight. The volatilized components are cooled by air and aggregate to generate fine particles (FP) including ultrafine particles (UFP). In the following description, the fine particles including the ultrafine particles may be referred to simply as FP/UFP. As a result, the fixing device may discharge the FP/UFP.

Currently, due to an increase in the awareness of environmental issues, the reduction of the FP/UFP discharged from products has been desired. The image forming apparatuses that reduce the generation of the FP/UFP are also to be developed.

Figure 17:
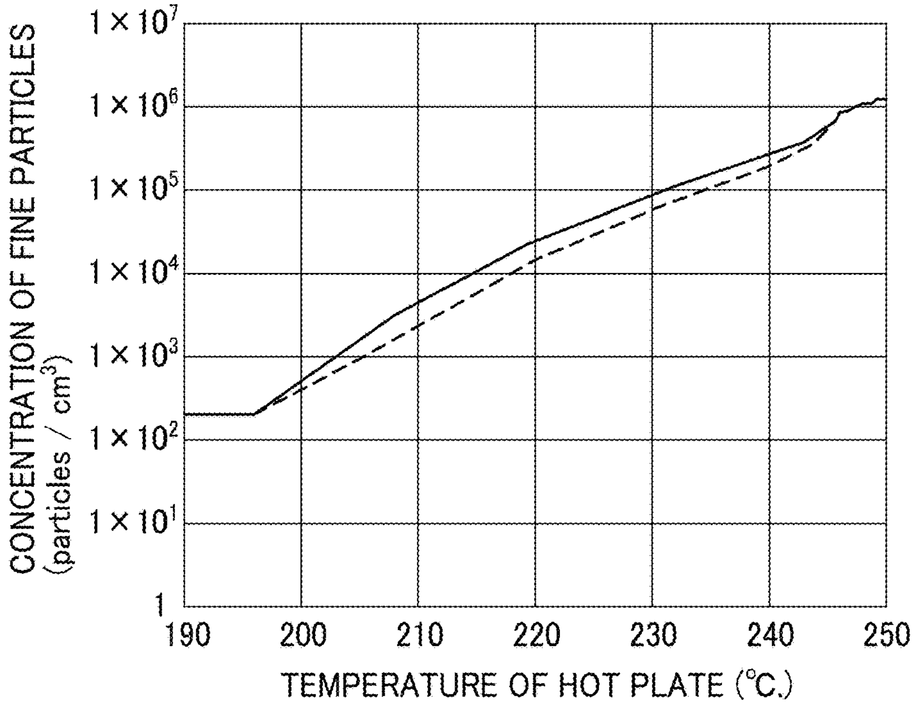
FIG. 17 is a graph illustrating a relation between the temperature of lubricant and the concentration of generated the fine particles including the ultrafine particles.

In view of the above, to consider how to reduce the generation of the FP/UFP from the fixing devices, the present inventors conducted experiments to examine the relation between the temperature rise of silicone oil and fluorine grease used as lubricants and the concentration of the FP/UFP generated from the lubricants (the number of the FP/UFP generated per 1 $cm^3$). FIG. 17 illustrates the results.

The experiments were performed in a test apparatus (a chamber having a volume of 1 $m^3$ and a ventilating frequency of 5 times) installed in a laboratory certified by the German environmental label "Blue Angel." Specifically, a dish containing a lubricant was placed on a hot plate and heated to 250° C. While the temperature of the hot plate was monitored, the concentration of generated FP/UFP having a diameter of 5.6 nm to 560 nm specified by the Blue Angel standard was measured, The concentration of generated FP/UFP was measured with a fast mobility particle sizer (FMPS3091 manufactured by Tokyo Dylec Corp.). As the lubricant, fluorine grease 70 mg and silicone oil 35 mg were used. In FIG. 17, a solid line indicates a number concentration of the FP/UFP generated from the fluorine grease, whereas a dashed line indicates the number concentration of the FP/UFP generated from the silicone oil, In FIG. 17, the horizontal axis indicates the temperature of the hot plate. Since the temperature rise of the hot plate and the temperature rise of the lubricant change substantially in synchronization with each other, the temperature of the hot plate is regarded as the temperature of the lubricant here.

As illustrated in FIG. 17, the generation of the FP/UFP from the fluorine grease indicated by the solid line and the generation of the FP/UFP from the silicone grease indicated by the dashed line started when the temperature exceeded about 195° C. The concentrations of the FP/UFP generated from the fluorine grease and the silicone grease started rapidly increasing when the temperature reached about 200° C.

In the fixing device in which the temperature can exceed 200° C., the lubricant is evaporated and then cooled in the atmosphere to be aggregated to generate the FP/UFP. To effectively reduce the FP/UFP, a temperature rise in a portion of the fixing device where the FP/UFP are likely to be generated is to be prevented.

However, the portion of the fixing device from which the FP/UFP are mostly generated has not been specified. For this reason, the inventors have conducted intensive studies on a main source that generates the FP/UFP. As a result, the inventors have found that the lubricant adhering to the belt holder is evaporated and mainly generates a large amount of the FP/UFP. A description is now given of the mechanism of generation of the FP/UFP and the reason why the large amount of the FP/UFP is generated mainly from the lubricant adhering to the belt holder.

Figure 18:
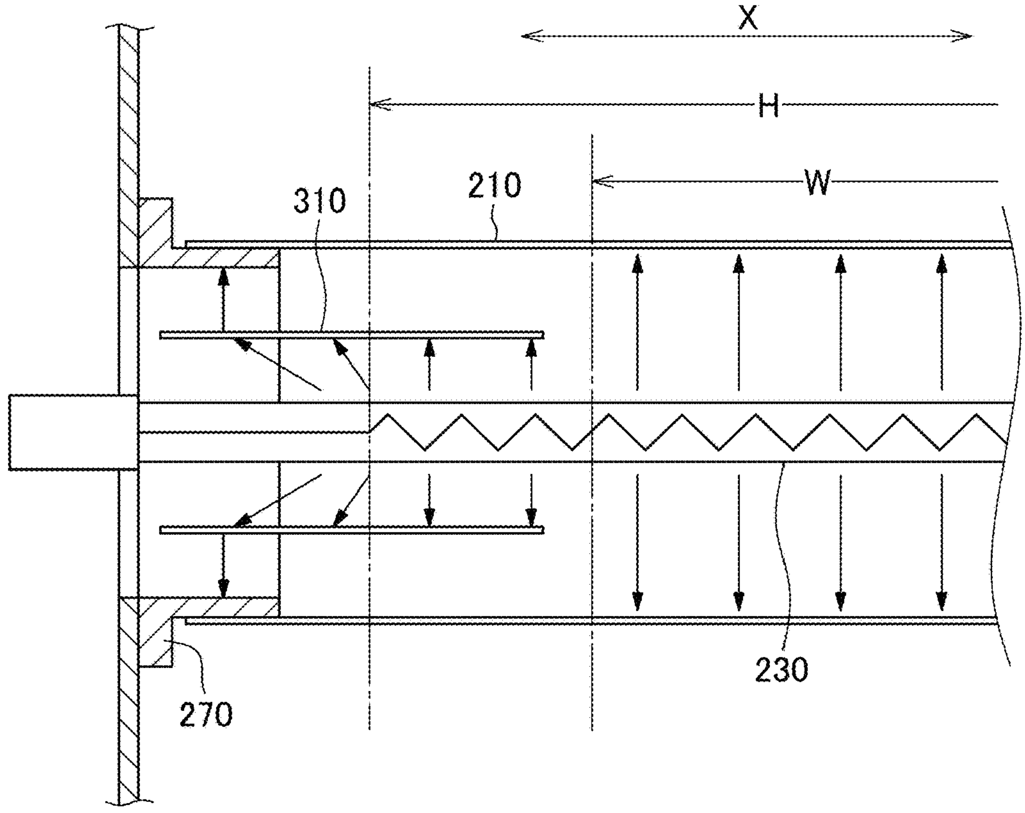
FIG. 18 is a cross-sectional view of the end portion of the fixing device according to a comparative embodiment, taken along the longitudinal direction of the fixing belt included in the fixing device.

FIG. 18 is a cross-sectional view of an end portion of a fixing device according to a. comparative embodiment, taken along the longitudinal direction X of a fixing belt 210 included in the fixing device.

As illustrated in FIG. 18, the fixing device according to the comparative embodiment includes a belt holder 270 that holds a longitudinal end portion of the fixing belt 210, like the fixing device according to the embodiment described above. Inside the fixing belt 210, a heat shield plate 310 is disposed to shield the radiant heat emitted from a heater 230.

An end portion of the heater 230 radially radiates heat-rays that can heat not only the fixing belt 210 but also the belt holder 270. To shield the heat-rays radiated from the heater 230 to the belt holder 270, the heat shield plate 310 is disposed between the belt holder 270 and the longitudinal end of the heater 230 as illustrated in FIG. 18.

However, as the heat shield plate 310 receives the heat-rays from the heater 230, the temperature of the heat shield plate 310 rises. The temperature rise of the heat shield plate 310, in particular, the temperature rise of a portion facing the belt holder 270 in the heat shield plate 310 causes heat transfer from the heat shield plate 310 to the belt holder 270 (see arrows in FIG. 18) via air, increasing the temperature of the belt holder 270.

Figure 19:
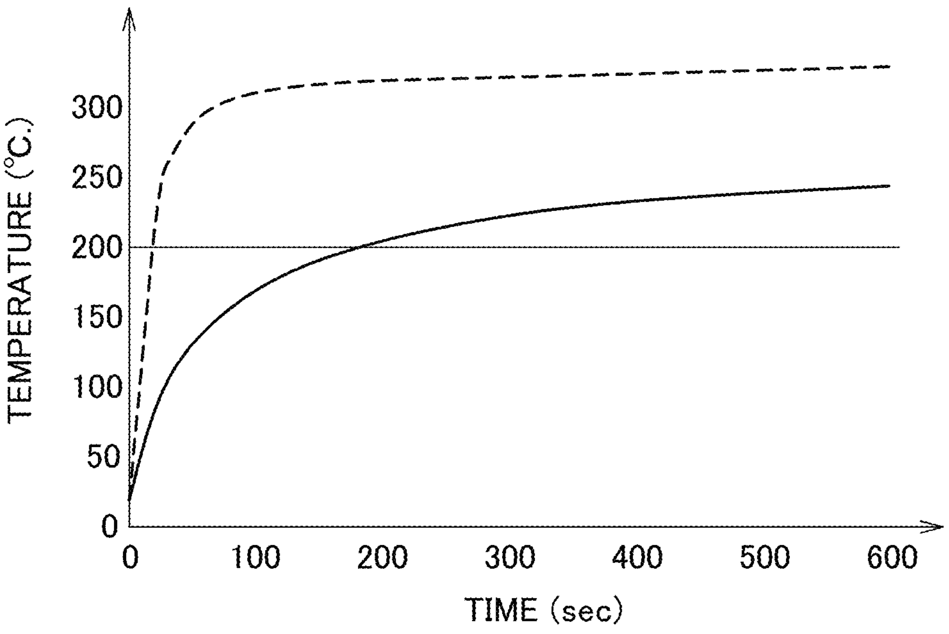
FIG. 19 is a graph illustrating a temperature rise in the heat shield plate and the belt holder of the fixing device of FIG. 18 while the image forming apparatus continuously prints images on recording media.

FIG. 19 is a graph illustrating changes in temperature in the heat shield plate 310 and the belt holder 270 while the image forming apparatus including the fixing device illustrated in FIG. 18 continuously prints images on recording media. In FIG. 19, the horizontal axis represents time (sec), and the vertical axis represents temperature (° C.). In FIG. 19, the dashed line indicates the temperature of the heat shield plate, and the solid curve indicates the temperature of the belt holder.

As illustrated in FIG. 19, as the temperature of the heat shield plate increases with time, the temperature of the belt holder also increases. The temperature of the heat shield plate rises to over 300° C. The temperature of the belt holder reaches 200° C. in about 200 seconds.

Figure 20:
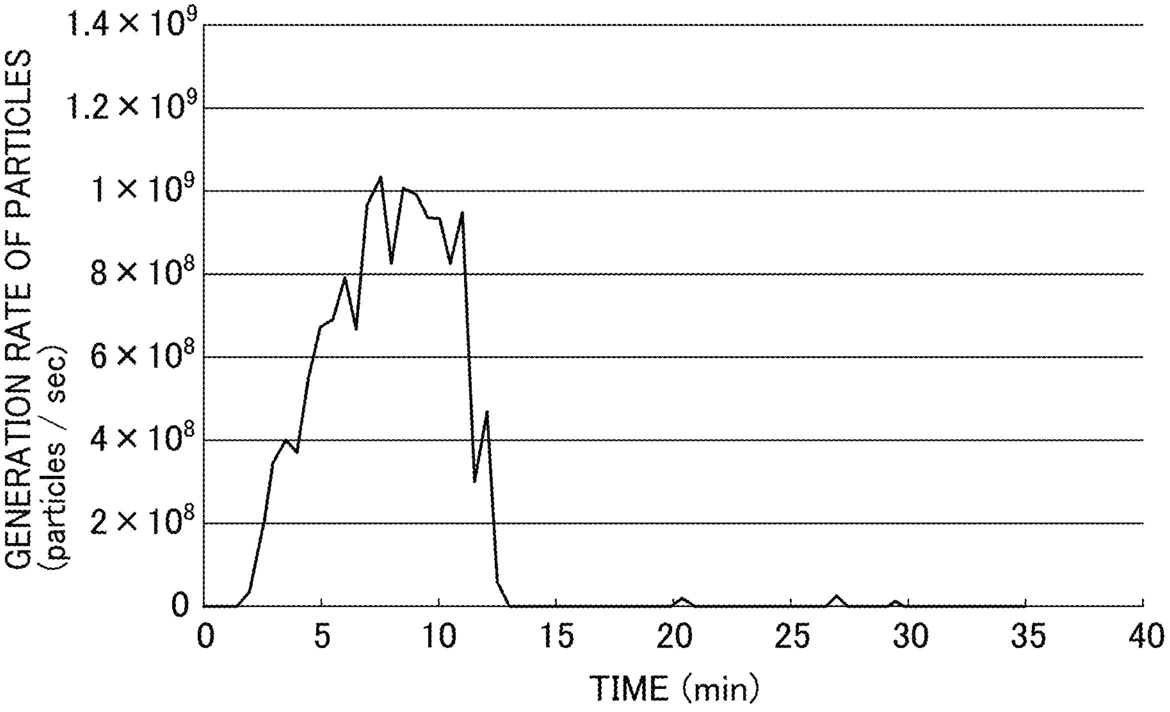
FIG. 20 is a graph illustrating veneration rates of the fine particles including the ultrafine particles during continuous printing in FIG. 19.

The present inventors performed an experiment in which the generation rates of the FP/UFP were measured in the fixing device of FIG. 18. FIG. 20 illustrates the result of the experiment. In FIG. 20, the horizontal axis represents time (min), and the vertical axis represents the generation rate (number/sec) of the FP/UFP. The experiment was performed as follows. The image forming apparatus including the fixing device according to the comparative embodiment was placed in a test room (that is a chamber having a volume of 2.18 $m^3$). While the image forming apparatus continuously performs the printing operations for ten minutes and outputs sheets, the generation rates of the FP/UFP illustrated in FIG. 20 were measured. The generation rate is defined as the number of generated FP/UFP per second. During the printing operations, the image forming apparatus formed no image on the sheet to avoid measuring the FP/UFP generated from wax in the toner. A printing speed during the continuous printing operations was 60 ppm (Page Par Minutes). The measurement target was the FP/UFP having a particle diameter of 5.6 [nm] to 560 [nm] defined in the Blue Angel standard.

The standard value of the generation rate of the FP/UFP is $3.5\times10^{11}$ (pieces/10 min), which is about $5.8\times10^{8}$ (pieces/sec). As illustrated in FIG. 20, the generation rate of the FP/UFP greatly exceeds the standard value of $3.5\times10^{11}$ (pieces/10 min) during the continuous printing for 10 minutes. In particular, the generation rate of the FP/UFP rapidly increases from about 3 minutes at which the temperature of the belt holder exceeds 200° C. in FIG. 19.

The above results of experiments illustrated in FIGS. 19 and 20 teach that the temperature rise in the belt holder while the image forming apparatus including the fixing device according to the comparative embodiment performs the continuous printing for ten minutes causes a great increase in the generation rate of the FP/UFP. This means that the lubricant adhering to the belt holder is a generation source of the FP/UFP. As a result, a key point to effectively reduce the number of FP/UFP generated from the fixing device is decreasing the temperature rise in the belt holder, that is, decreasing the temperature rise of the lubricant adhering to the belt holder.

In the embodiments of the present disclosure, the following measures are taken to prevent the temperature rise in the belt holder.

As illustrated in FIG. 3, the fixing device 20 according to the present embodiment includes a shield 30. The shield 30 includes a first heat shield plate 31 as a first shield and a second heat shield plate 32 as a second shield. In the present embodiment, the first shield is separated from the second shield, The first heat shield plate 31 and the second heat shield plate 32 are arranged side by side in the longitudinal direction X and have a gap between the first heat shield plate 31 and the second heat shield plate 32, which serves as a heat transfer reducer. The heat transfer reducer is a structure to reduce heat transferred between the first heat shield plate 31 and the second heat shield plate 32. The first heat shield plate 31 is closer to the center of the fixing belt 21 in the longitudinal direction X of the fixing belt 21 than the second heat shield plate 32.

The first heat shield plate 31 extends in the longitudinal direction X and is outside a sheet passing region W in the longitudinal direction X. The first heat shield plate 31 faces the heater 23 and the fixing belt 21 and is between the heater 23 and the fixing belt 21. The second heat shield plate 32 is outside a heat generation range FT of the heater 23 in the longitudinal direction X. The second heat shield plate 32 faces the belt holder 27 and is between the heater 23 and the belt holder 27. The heat generation range H of the heater 23 in the present embodiment is a range where the heater 23 mainly generates heat. Specifically, the heat generation range H of the heater is a range that generates a larger amount of heat than a range facing the belt holder 27 in the heater 23. For example, the heat generation range H of the halogen heater is a coil-shaped portion. In general, a wire having a wire diameter d of about 0.1 mm or more and 0.3 mm or less forms the coil-shaped portion having a diameter D of 0.6 mm or more and 1 mm or less to form the heat generation range H. A pitch p between the wires in the coil-shaped portion is less than or equal to 1 mm, preferably greater than 0.2 mm and less than 0.5 mm. The coil-shaped portion satisfies the following condition:

$$1.2 \leq p/d \leq 1.8.$$

The heat generation range H of the carbon heater is a spiral portion formed by carbon fibers and having a pitch of 10 mm or less, typically about 2 mm to 5 mm. The heat generation range H of the ceramic heater is formed by resistive heat generators on a base.

The first heat shield plate 31 and the second heat shield plate 32 are made of metal having excellent heat resistance and high thermal conductivity, for example, SUS, aluminum, copper or the like. Preferably, surfaces of the first heat shield plate 31 and the second heat shield plate 32 facing the heater 23 are plated with aluminum, nickel, or the like having a high reflectance of heat and light.

The first heat shield plate 31 shields the heat transferred from the heater 23 to a non-sheet passing region of the fixing belt 21. The non-sheet passing region is an end of the fixing belt 21 in the longitudinal direction X. The sheet passing through the fixing device does not contact the non-sheet passing region. Therefore, temperature in the non-sheet passing region is likely to be too high. The first heat shield plate 31 hinders the temperature rise of the fixing belt 21 in the non-sheet passing region. The second heat shield plate 32 shields the heat transferred from the heater 23 to the belt holder 27.

The heat shield plate 310 in the comparative embodiment illustrated in FIG. 18 faces the belt holder 27 and a part of the heat generation range H. The heater 23 radiates the radiant heat to a part of the heat shield plate 310 facing the heater 23. As a result, the temperature of the heat shield plate 310 is likely to rise. The temperature rise in the heat shield plate 310 causes temperature rise in the belt holder 270 facing the heat shield plate 310 because the heat shield plate 310 heats the belt holder 270 via the air. In contrast, the first heat shield plate 31 is separated from the second heat shield plate 32 in the present embodiment, which forms the heat transfer reducer. That is, the first heat shield plate 31 and, the second heat shield plate 32 are arranged with the gap. The first heat shield plate 31 faces the heat generation range H of the heater 23 and is particularly easily heated by the heater 23. The second heat shield plate 32 faces the belt holder 27 and shields the heat transferred from the heater 23 to the belt holder 27. The above-described structure includes the first heat shield plate 31 and the second heat shield plate 32 as separate members. Therefore, the above-described structure reduces the heat transferred from the first heat shield plate 31 to the second heat shield plate 32 and reduces the temperature rise in the second heat shield plate 32. Reducing the temperature rise in the second heat shield plate 32 reduces the heat transferred from the second heat shield plate 32 to the belt holder 27. As a result, the above-described structure reduces the temperature rise in the belt holder 27. Reducing the temperature rise in the belt holder 27 reduces the temperature rise of the lubricant adhering to the belt holder 27. As a result, the above-described structure reduces the generation of the FP/UFP caused by the volatilization of the lubricant.

In particular, in the present embodiment, the first heat shield plate 31 is separated, from the second heat shield plate 32 in the longitudinal direction X with the gap. Such a configuration reduces the heat transferred from the first heat shield plate 31 to the second heat shield plate 32 and prevents the temperature rise of the belt holder 27.

Figure 4:
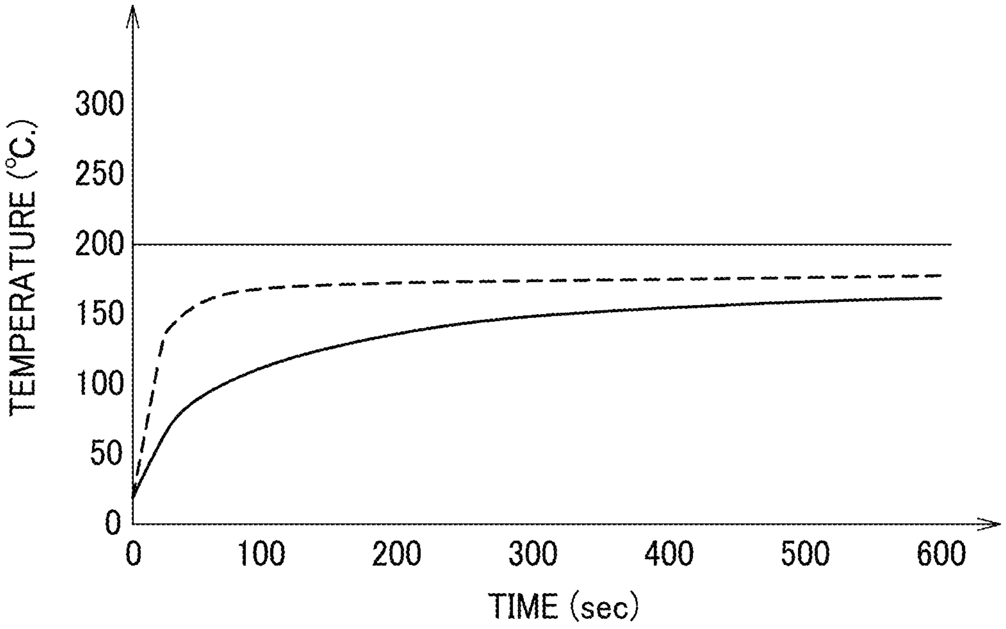
FIG. 4 is a graph illustrating a temperature rise in a heat shield plate and a belt holder of the fixing device according to the embodiment while the image forming apparatus continuously prints images on recording media.
Figure 5:
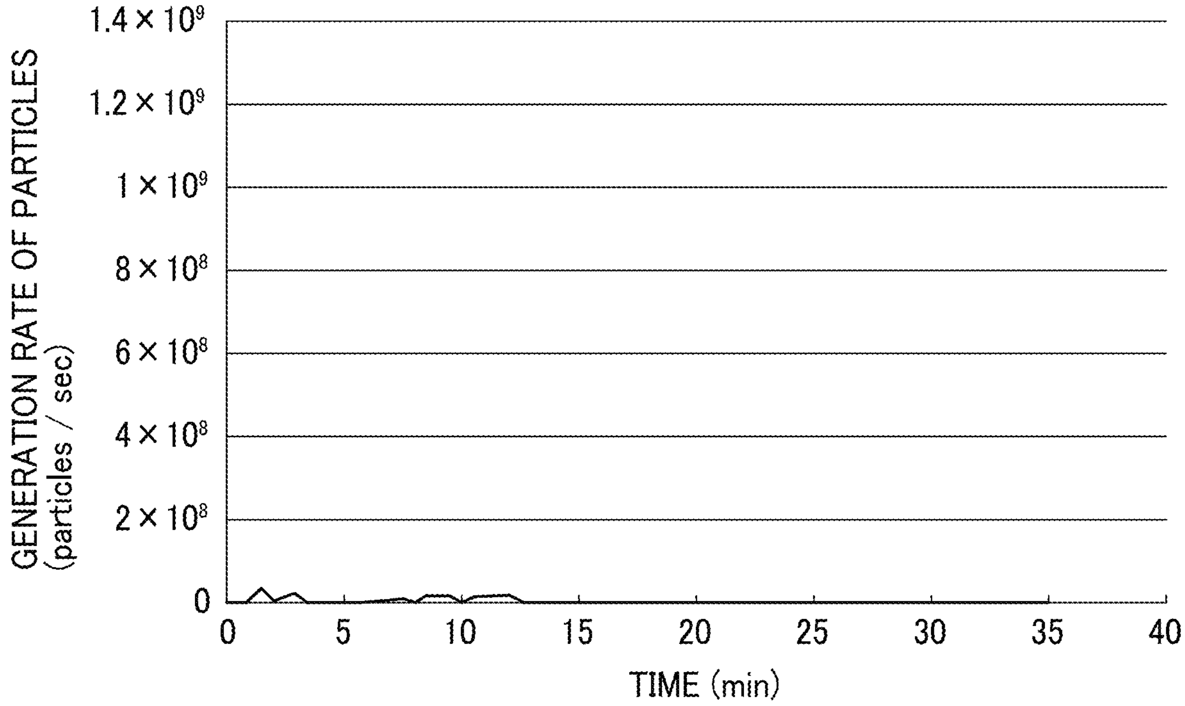
FIG. 5 is a graph illustrating generation rates of fine particles including ultrafine particles during a continuous printing operation in FIG. 4.

FIG. 4 is a graph illustrating the temperature rise in the second heat shield plate and the belt holder of the fixing device according to the present embodiment while the image forming apparatus continuously prints images on recording media for ten minutes. FIG. 5 is a graph illustrating generation rates of fine particles including ultrafine particles for the ten minutes. The generation rate means the number of generated fine particles including the ultrafine particles per unit time. In FIG. 4, the horizontal axis represents time t (sec), the vertical axis represents temperature T (° C.), the solid line represents the temperature of the belt holder, and the dashed line represents the temperature of the second heat shield plate. In FIG. 5, the horizontal axis represents time (min), and the vertical axis represents the generation rate of fine particles including the ultrafine particles, Measurement conditions regarding FIGS. 4 and 5 are the same as those regarding FIGS. 19 and 20 that illustrate the results of the experiments using the fixing device according to the comparative embodiment.

As illustrated in FIG. 4, the temperature rise of the second heat shield plate and the temperature rise of the belt holder in the fixing device according to the present embodiment are smaller than those in the fixing device according to the comparative embodiment, and temperatures do not exceed 200° C.

Specifically, the temperature of the second heat shield plate is lower than 180° C., and the temperature of the belt holder is lower than 170° C. The heat transfer reducer between the second heat shield plate and the first heat shield plate can reduce the temperature rise of the second heat shield plate. As illustrated in FIG. 5, reducing the temperature rise of the second heat shield plate greatly reduces the generation rate of fine particles including ultrafine particles caused by the volatilization of the lubricant adhering to the belt holder. The generation rate was smaller than the BA-standard value that is $3.5\times10^{11}$ (pieces/10 min), that is, about $5.8\times10^{8}$ (pieces/sec). The generation rates of the FP/UFP in FIG. 5 were smaller than those in FIG. 20.

In the present embodiment, a part of the first heat shield plate 31 covers a part of the heat generation range H of the heater 23 as illustrated in FIG. 3. However, the first heat shield plate 31 may be disposed outside the heat generation range H not to cover the heat generation range H.

Figure 6:
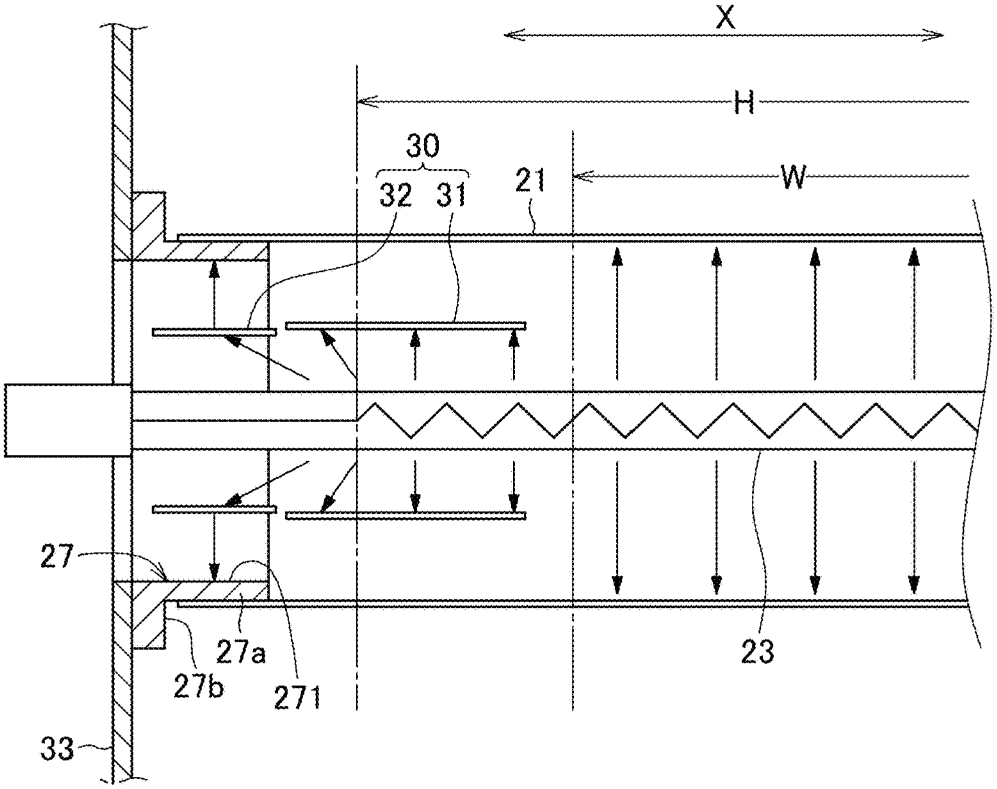
FIG. 6 is a cross-sectional view of an end portion of the fixing device, taken along the longitudinal direction of the fixing belt included in the fixing device according to a second embodiment of the present disclosure.

In the embodiment of FIG. 3, the first heat shield plate 31 and the second heat shield plate 32 are at substantially the same distance from the heater 23, but the embodiments of the present disclosure are not limited to this. For example, the fixing device according to a second embodiment illustrated in FIG. 6 includes the second heat shield plate 32 that is closer to the heater 23 than the first heat shield plate 31 on a plane orthogonal to the longitudinal direction X. In other words, the second heat shield plate 32 is closer to the heater 23 than the first heat shield plate 31 in a direction orthogonal to the longitudinal direction. The above-described structure increases a distance between the second heat shield plate 32 and the belt holder 27, which increases a thermal resistance between the second heat shield plate 32 and the belt holder 27. As a result, the above-described structure further decreases the heat transferred from the second heat shield plate 32 to the belt holder 27 via the air. As a result of an experiment similar to the experiment that gave the results illustrated in FIG. 4, the temperature of the belt holder 27 was about 5 degrees lower than the temperature of the belt holder 27 illustrated in FIG. 3.

Figure 7:
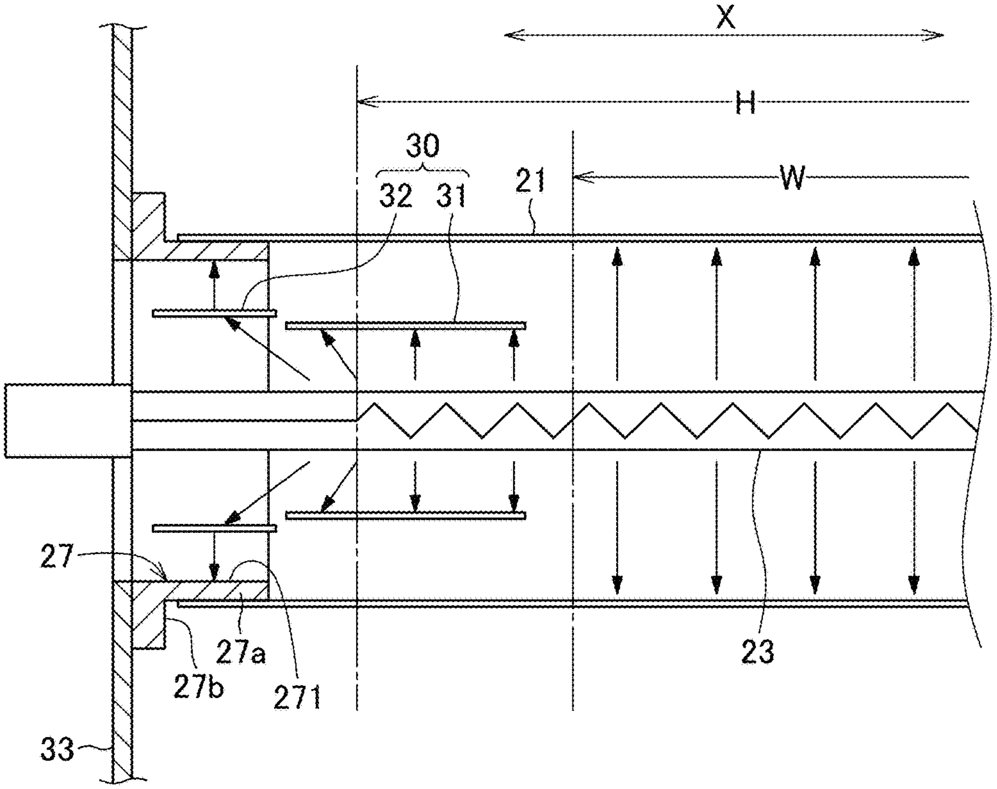
FIG. 7 is a cross-sectional view of an end portion of the fixing device, taken along the longitudinal direction of the fixing belt included in the fixing device according to a third embodiment of the present disclosure.

On the contrary, the fixing device according to a third embodiment illustrated in FIG. 7 includes the second heat shield plate 32 that is farther to the heater 23 than the first heat shield plate 31 on the plane orthogonal to the longitudinal direction X, In other words, the first heat shield plate 31 is closer to the heater 23 than the second heat shield plate 32 in the direction orthogonal to the longitudinal direction. The above-described structure prevents heat-rays from the heater 23 from entering the belt holder 27 through the gap between the first heat shield plate 31 and the second heat shield plate 32. In a case where the heat-rays of the heater 23 easily enters the belt holder 27 from the gap between the first heat shield plate 31 and the second heat shield plate 32, the above-described structure of the present embodiment is suitable.

Figure 8:
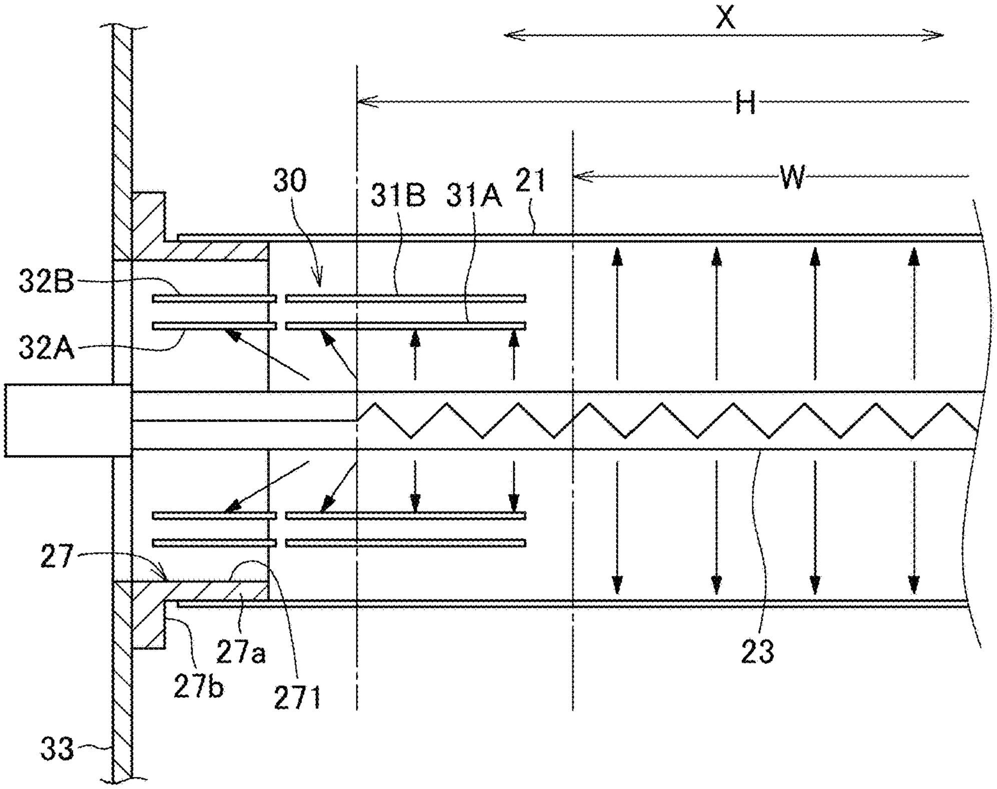
FIG. 8 is a cross-sectional view of an end portion of the fixing device, taken along the longitudinal direction of the fixing belt included in the fixing device according to a fourth embodiment of the present disclosure.

The fixing device according to a fourth embodiment illustrated in FIG. 8 includes a plurality of (two in FIG. 8) first heat shield plates between the heater 23 and the fixing belt 21 and a plurality of (two in FIG. 8) second heat shield plates between the heater 23 and the belt holder 27. Specifically, the fixing device according to the fourth embodiment includes an inner first heat shield plate 31A and an outer first heat shield plate 31B, and an inner second heat shield plate 32A and an outer second heat shield plate 32B.

In other words, the fixing device according to the fourth embodiment includes another first heat shield plate 31B between the first heat shield plate 31A and the fixing belt 21 in a direction orthogonal to the longitudinal direction X and another second heat shield plate 32B between the second heat shield plate 32A and the belt holder 27 in the direction orthogonal to the longitudinal direction X. However, the fixing device may not always include a plurality of first heat shield plates and a plurality of second heat shield plates and, for example, may include the first shield plate and the plurality of second heat shield plate. In addition, the first heat shield plate 31A and the first heat shield plate 31B may not be separate members, and the second heat shield plate 32A and the second heat shield plate 32B may not be separate members. In other words, the fixing device as the heating device may include multiple first heat shield plates as multiple first shields and the second heat shield plate as the second shield. The fixing device as the heating device may include the first heat shield plate as the first shield and multiple second heat shield plates as multiple second shields.

A multiple structure including multiple heat shields reduces the heat transferred from the heater 23 to the belt holder 27 and the end of the fixing belt 21. That is, the second heat shield plate 32B between the second heat shield plate 32A and the belt holder 27 or the first heat shield plate 31B between the first heat shield plate 31A and the fixing belt 21 further increases the thermal resistance between the inner second heat shield plate 32A and the belt holder 27. The above-described structure reduces the heat transferred to the belt holder 27 due to convection of air and further decreases the temperature rise of the belt holder 27. As a result of an experiment similar to the experiment that gave the results illustrated in FIG. 4, the temperature of the belt holder 27 was about 10 degrees lower than the temperature of the belt holder 27 illustrated in FIG. 3. Additionally, the above-described structure increases the thermal resistance between the first heat shield plate 31A and the fixing belt 21 and reduces the heat transferred from the heater 23 to the end of the fixing belt 21.

The outer first heat shield plate 31B and the outer second heat shield plate 32B, which are farther from the heater 23 than the inner first heat shield plate 31A and the inner second heat shield plate 32A, are preferably thinner than the inner first heat shield plate 31A and the inner second heat shield plate 32A, respectively. The above-described structure increases the distance from the inner first heat shield plate 31A to the fixing belt 21 and the distance from the inner second heat shield plate 32A to the belt holder 27. A thermal conductivity of the outer first heat shield plate 31B or the outer second heat shield plate 32B is preferably lower than a thermal conductivity of the inner first heat shield plate 31A or the inner second heat shield plate 32A. The above-described structure reduces the heat transferred from the outer first heat shield plate 31B or the outer second heat shield plate 32B to the fixing belt 21 or the belt holder 27.

Figure 9:
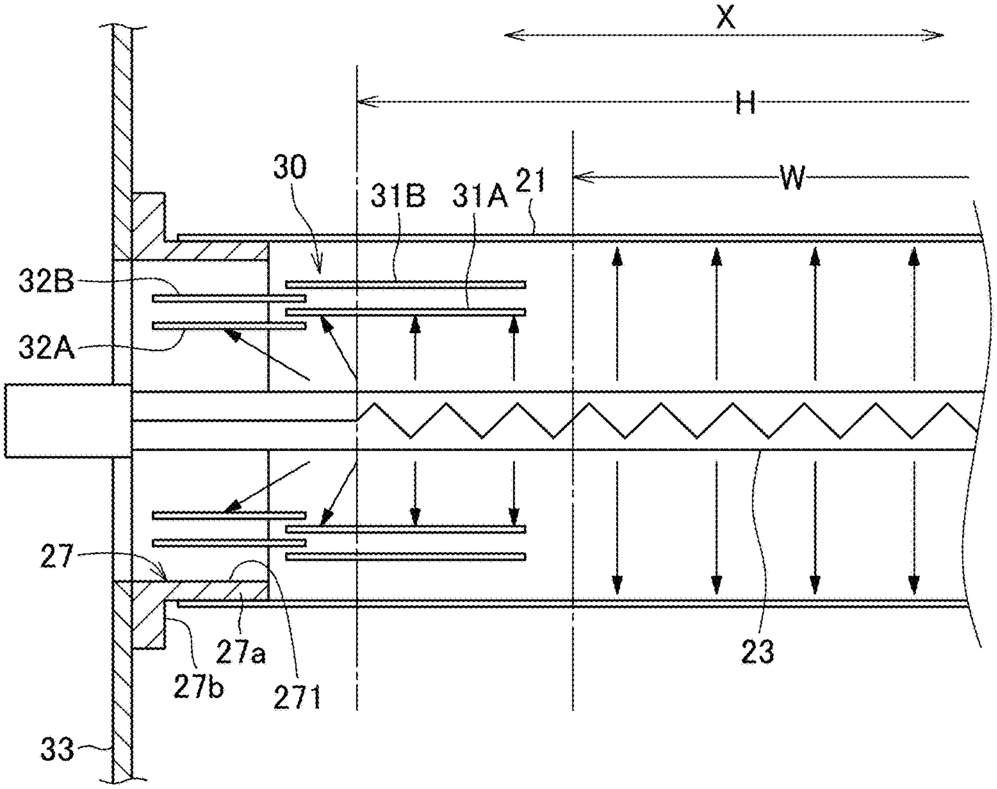
FIG. 9 is a cross-sectional view of an end portion of the fixing device, taken along the longitudinal direction of the fixing belt included in the fixing device according to a fifth embodiment of the present disclosure.

Although the first heat shield plate and the second heat shield plate are disposed with a gap therebetween in the longitudinal direction X in the embodiment illustrated in FIG. 8, the present disclosure is not limited to this. For example, the fixing device according to a fifth embodiment illustrated in FIG. 9 includes the first heat shield plates 31A and 31B and the second heat shield plates 32A and 32B that partially overlap each other when viewed in a direction orthogonal to the longitudinal direction X. The above-described structure prevents the heat-rays from entering the belt holder 27 from gaps between the first heat shield plates and the second heat shield plates. It is preferable that end parts of the first heat shield plates 31A and 31B are slightly overlapped with end parts of the second heat shield plates 32A and 32B in the direction orthogonal to the longitudinal direction so that the heat-rays are prevented from entering the belt holder 27 from gaps between the first heat shield plates and the second heat shield plates. As a result, the above-described structure reduces the temperature rise of the belt holder 27. In the fifth embodiment, the first heat shield plates 31A and 31B and the second heat shield plates 32A and 32B are arranged in a radial direction of the loop of the fixing belt 21 with gaps, which forms the heat transfer reducer, The radial direction is the direction orthogonal to the longitudinal direction X. In the fifth embodiment, the plurality of first heat shield plates 31A and 31B and the plurality of second heat shield plates 32A and 32B overlap each other when viewed in the direction orthogonal to the longitudinal direction, but a single first heat shield plate 31 and a single second heat shield plate 32 in the third embodiment illustrated in FIG. 7 may overlap each other when viewed in the direction orthogonal to the longitudinal direction. In other words, an end part of the first shield may be overlapped with an end part of the second shield in a direction orthogonal to the longitudinal direction.

Figure 10A:
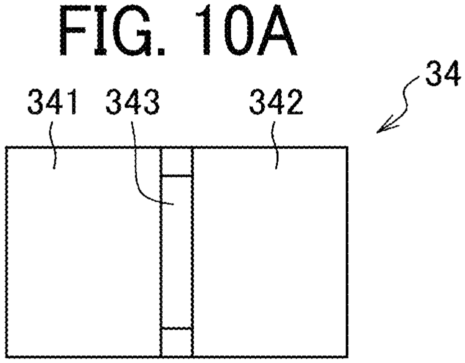
FIG. 10A is a top view of a heat shield plate in the fixing device according to a sixth embodiment of the present disclosure.
Figure 10B:
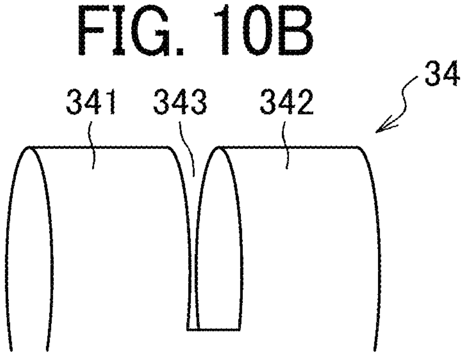
FIG. 10B is a perspective view of the heat shield plate in the fixing device according to the sixth embodiment.

In the above embodiments, the first heat shield plate 31 as the first shield and the second heat shield plate 32 as the second shield are the separated members, but the present disclosure is not limited to this. For example, the fixing device according to a sixth embodiment illustrated in FIGS. 10A and 10B includes a heat shield plate 34 having a first heat shield portion 341 as the first shield and a second heat shield portion 342 as the second shield. The first heat shield portion 341 is between the heater 23 and the fixing belt 21 and covers the part of the heater 23. The second heat shield portion 342 is between the heater 23 and the belt holder 27 and covers the belt holder 27. The first heat shield portion 341 is connected to the second heat shield portion 342 to form the heat shield plate 34 as one component. The heat shield plate 34 has a slit 343 between the first heat shield portion 341 and the second heat shield portion 342. This structure serves as the heat transfer reducer. In other words, the fixing device according to the sixth embodiment has the heat transfer reducer having a connecting portion connecting the first heat shield portion 341 as the first shield to the second heat shield portion 342 as the second shield in the longitudinal direction and the slit 343 at a position corresponding to the connection portion in the longitudinal direction to divide the heat shield plate 34 as the shield into the first shield and the second shield, The smaller the length of the slit 343 in the longitudinal direction, the better the effect shielding the heat-rays, but is preferably 0.5 mm or more and 1.0 mm or less to decrease the heat transferred from the first heat shield portion 341 to the second heat shield portion 342. The above-described structure having the slit 343 reduces the heat transferred from the first heat shield portion 341 to the second heat shield portion 342. The above-described structure reduces the temperature rise of the second heat shield portion 342, which reduces the temperature rise of the belt holder 27. The heating device according to the sixth embodiment including the single heat shield plate having the first shield and the second shield has a simpler structure than the heating device including the separated members as the first shield and the second shield as illustrated in FIG. 3, which reduces the cost.

Figure 11:
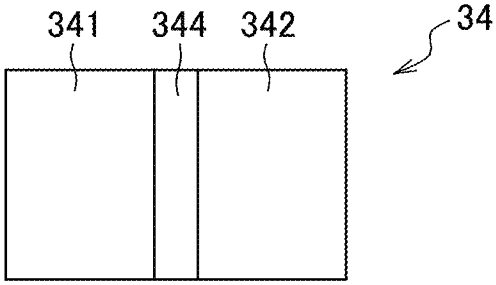
FIG. 11 is a cross-sectional view of an end portion of the fixing device, taken along the longitudinal direction of the fixing belt included in the fixing device according to a seventh embodiment of the present disclosure.

As illustrated in FIG. 11, the heating device may include thermal insulator 344 being between the first heat shield portion 341 and the second heat shield portion 342 and having a thermal conductivity lower than the thermal conductivity of the first heat shield portion 341 or the second heat shield portion 342, which serves as the heat transfer reducer. Specifically, the thermal insulator 344 is made of resin having high heat resistance, such as PEEK, PPS, LCP, and PET. The thermal conductivity of the thermal insulator 344 is 0.1 W/m·K or more and 0.2 W/m·K or less that is about 1% of the thermal conductivity of the first heat shield portion 341 or the second heat shield portion 342.

The above-described structure reduces the heat transferred from the first heat shield portion 341 to the second heat shield portion 342. The above-described structure reduces the temperature rise of the second heat shield portion 342, which reduces the temperature rise of the belt holder 27.

Figure 12:
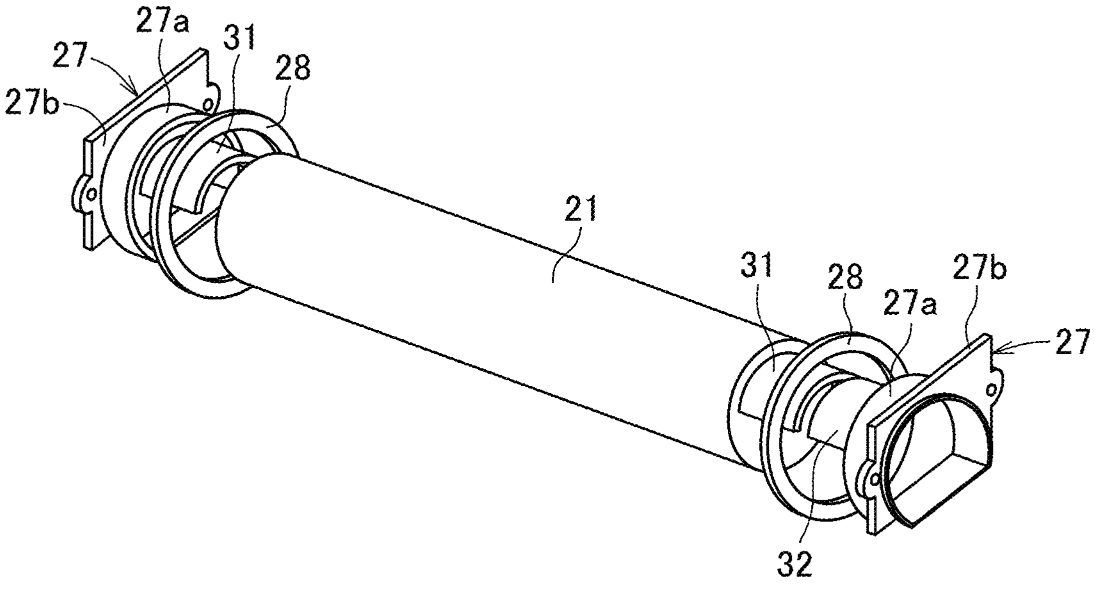
FIG. 12 is a perspective view of the fixing device of FIG. 2.

As illustrated in FIG. 12, the fixing device 20 of each of the embodiments may include a sliding ring 28 between the belt holder 27 and the fixing belt 21. The sliding ring 28 is mounted on an outer circumferential surface of an insertion 27*a* of the belt holder 27, which is inserted into the loop formed by the fixing belt 21. The sliding ring 28 is interposed between a longitudinal edge of the fixing belt 21 and a restraint 27*b* of the belt holder 27. As the fixing belt 21 rotates, the sliding ring 28 rotates together with the fixing belt 21, or the fixing belt 21 slides over the low friction sliding ring 28. Thus, the sliding resistance that is generated between the fixing belt 21 and the belt holder 27 is reduced. According to the embodiments of the present disclosure, the configuration of the fixing device is not limited to the configuration described above. The embodiments of the present disclosure may be applied to fixing devices having various configurations. A description is now given of some examples of the configuration of the fixing device to which the embodiments of the present disclosure are applicable.

Figure 13:
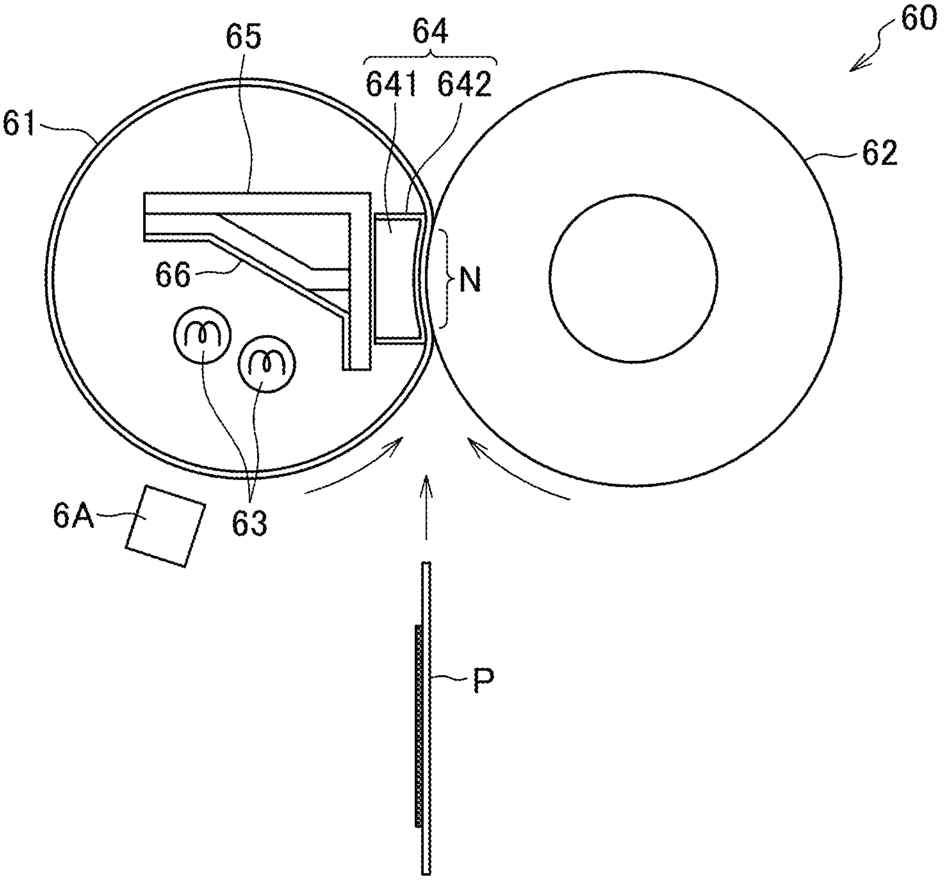
FIG. 13 is a schematic cross-sectional view of a central portion of the fixing device according to an embodiment different from the embodiment illustrated in FIG. 2.
Figure 14:
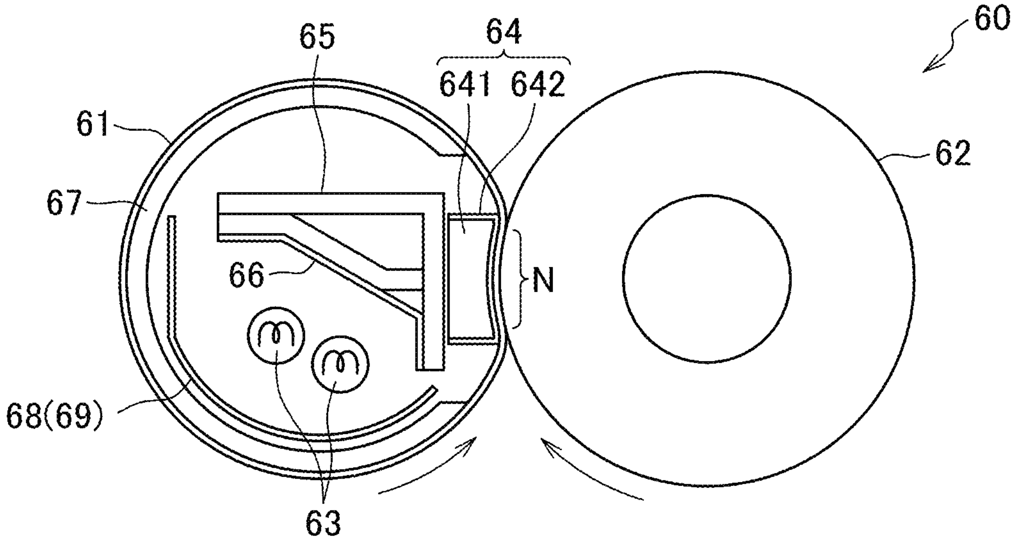
FIG. 14 is a schematic cross-sectional view of an end portion of the fixing device of FIG. 13.

A fixing device 60 that is illustrated in FIGS. 13 and 14 is a fixing device including halogen heaters (i.e., heaters 63) as heating sources, like the fixing device 20 illustrated in FIG. 2. Specifically, the fixing device 60 illustrated in FIG. 13 includes a fixing belt 61, a pressure roller 62, the heaters 63, a nip formation pad 64, a stay 65, a reflector 66, temperature sensors 6A, belt holders 67 (see FIG. 14), the shields including first heat shield plates 68 and second heat shield plates 69. The fixing device 60 according to the present embodiment includes multiple (two) halogen heaters 23. The nip formation pad 64 includes a metal base pad 641 and a sliding sheet 642 that is interposed between the base pad 641 and an inner circumferential surface of the fixing belt 61.

The temperature sensor 6A is a temperature detector that detects the temperature of the fixing belt 61. In the present embodiment, the temperature sensor 6A is a non-contact type temperature sensor that is disposed so as not to contact the outer circumferential surface of the fixing belt 61. In this case, the temperature sensor 6A detects the temperature of the outer circumferential face of the fixing belt 61. The temperature sensor 6A is not limited to the non-contact type temperature sensors and may be contact type temperature sensors that contact the fixing belt 61 to detect the surface temperature. The temperature sensor 6A may be, for example, a thermopile, a thermostat, a thermistor, or the non-contact type (NC) temperature sensor. Based on results detected by the temperature sensors 6A, a controller controls power supplied to the heaters 63 to heat the fixing belt 61 to an appropriate temperature.

In the present embodiment, radiant heat from the heater 63 heats the belt holder 67, which increases the temperature of the belt holder 67. The temperature rise of the belt holder 67 causes the temperature rise of the lubricant adhering to the belt holder 67, and the lubricant is evaporated, The evaporated lubricant is aggregated in the atmosphere and may generate the FP/UFP. For this reason, the fixing device 60 also includes the shield in each of the above-described embodiments. Specifically, the fixing device 60 includes a first shield facing the fixing belt 61 and the heater 63 and a second shield disposed outside the heat generation range of the heater 63 and facing the belt holder 67. The above-described structure reduces the temperature rise of the belt holder 67 and decreases the generation rate of the FP/UFP.

Figure 15:
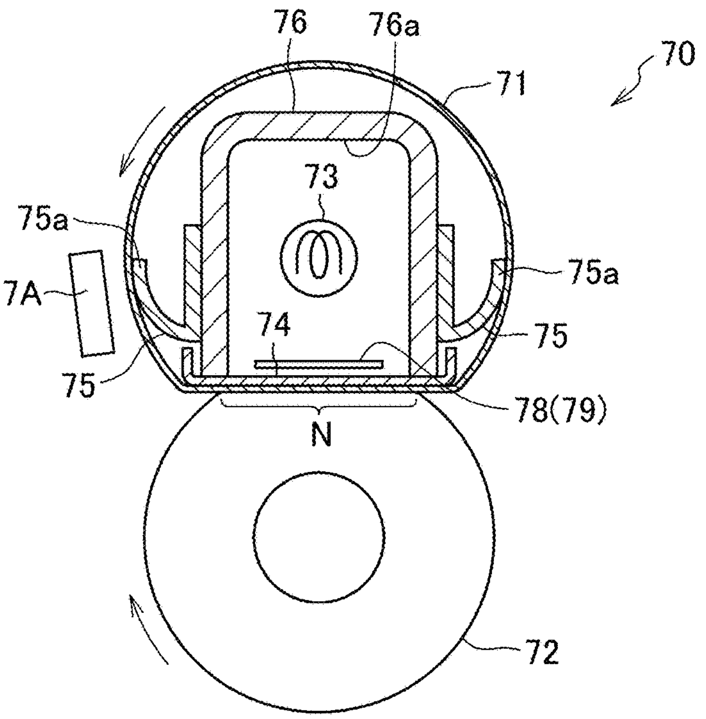
FIG. 15 is a schematic cross-sectional view of an end portion of the fixing device according to an embodiment different from the embodiments illustrated in FIGS. 2 and 13.
Figure 16:
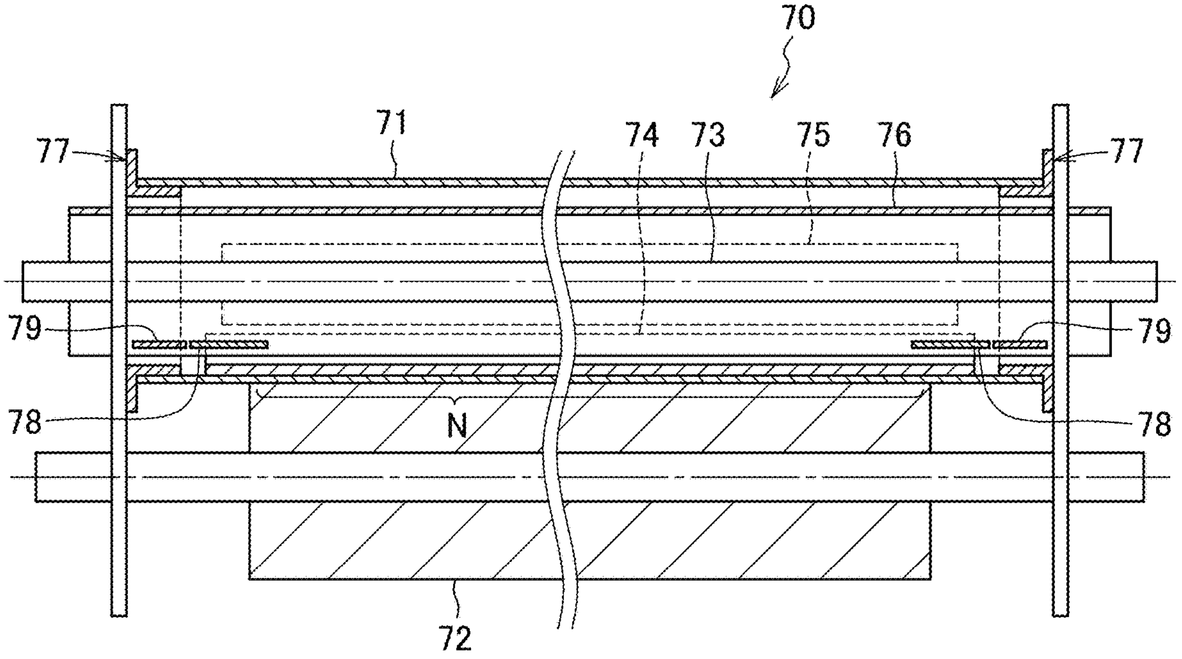
FIG. 16 is a cross-sectional view of the fixing device illustrated in FIG. 15, taken along the longitudinal direction of the fixing belt included in the fixing device.

A fixing device 70 that is illustrated in FIGS. 15 and 16 includes a halogen heater (i.e., a heater 73) as a heating source, like the fixing device 20 illustrated in FIG. 2. Specifically, the fixing device 70 illustrated in FIG. 15 includes a fixing belt 71, a pressure roller 72, the heater 73, a nip formation pad 74, a reflector 76, a temperature sensor 7A (see FIG. 15), belt holders 77 (see FIG. 16), the first heat shield plates 78, second heat shield plates 79, and guides 75.

The fixing belt 71, the pressure roller 72, the heater 73, the nip formation pad 74, the reflector 76, the belt holders 77, the first heat shield plates 78, and the second heat shield plates 79 that are illustrated in FIGS. 15 and 16 are basically the same in function as the fixing belt 21, the pressure roller 22, the heater 23, the nip formation pad 24, the reflector 26, the belt holders 27, the first heat shield plates 31, and the second heat shield plates 32, respectively, illustrated in FIG. 2. However, the first heat shield plate 78 is opposite the fixing belt 71 via the nip formation pad 74.

The reflector 76 illustrated in FIGS. 15 and 16 reflects the radiant heat (that is, infrared rays) emitted from the heater 73 mainly to the nip formation pad 74, not to the fixing belt 71. The reflector 76 has a U-shaped cross-section to cover the outside of the heater 73. The reflector 76 has a reflection face 76*a* as an inner face facing the heater 73 and having a relatively high reflectance. When the radiant heat is emitted from the heater 73, the reflection face 76*a* of the reflector 76 reflects the radiant heat to the nip formation pad 74.

As a result, the nip formation pad 74 is heated by the radiant heat emitted from the heater 73 toward the nip formation pad 74 and the radiant heat reflected by the reflector 76 to the nip formation pad 74. The heat is conducted from the nip formation pad 74 to the fixing belt 21 at the nip N. In this case, the nip formation pad 74 that forms the nip N functions as a heat conductor that conducts heat to the fixing belt 71 at the nip N. To conduct heat, the nip formation pad 74 is made of metal having good thermal conductivity such as copper or aluminum.

The reflector 76 also functions as a support (in other words, a stay) that supports the nip formation pad 74. Since the reflector 76 supports the nip formation pad 74 throughout the length of the fixing belt 71, the bending of the nip formation pad 74 is prevented and the nip N having a uniform width is formed between the fixing belt 71 and the pressure roller 72. The reflector 76 is preferably made of metal having relatively high rigidity such as SUS or SECC to ensure the function as a support.

The guides 75 are disposed inside the loop of the fixing belt 71 to guide the inner circumferential surface of the fixing belt 71 rotating. Each of the guides 75 has a guide face curving along the inner circumferential surface of the fixing belt 71. As the fixing belt 71 is guided along the guide face 75*a*, the fixing belt 71 smoothly rotates without being largely deformed.

In the present embodiment, the radiant heat from the heater 73 heats the belt holder 77, which increases the temperature of the belt holder 77. The temperature rise of the belt holder 77 causes the temperature rise of the lubricant adhering to the belt holder 77, and the lubricant is evaporated. The evaporated lubricant is aggregated in the atmosphere and may generate the FP/UFP. Fax this reason, the fixing device 70 also includes the shield in each of the above-described embodiments. Specifically, the fixing device 70 includes a first shield facing the fixing belt 71 and the heater 73 and a second shield disposed outside the heat generation range of the heater 73 and facing the belt holder 77. The above-described structure reduces the temperature rise of the belt holder 77 and decreases the generation rate of the FP/UFP.

In the above description, the embodiments of the present disclosure are applied to the fixing device incorporated in the electrophotographic image forming apparatus as illustrated in FIG. 1. However, the present disclosure is not limited to this. The embodiments of the present disclosure may be applied to a heating device other than the fixing device, such as a drying device that is included in an inkjet image forming apparatus and dries liquid such as ink applied to a sheet.

Since the temperature rise of the belt holder as a factor of generating the FP/UFP is more remarkable in the image forming apparatus in which the number of sheets conveyed per unit time is larger, a great effect is expected when the embodiments of the present disclosure are applied particularly to the image forming apparatus in which a large number of sheets can be conveyed. The number of FP/UFP generated from the fixing device during 10 minutes of continuous printing becomes particularly large when the printing speed exceeds 50 pages per minute (ppm). Thus, when the embodiments of the present disclosure are applied to a fixing device or an image forming apparatus having a printing speed equal to or greater than 50 ppm, a greater effect is expected.

Although the fluorine grease and the silicone oil are used as the substances that generate the FP/UFP in the above embodiments, another liquid or semi-solid lubricating substance besides the fluorine grease and the silicone oil may be used in another embodiment of the present disclosure.

Even in a case where another liquid or semi-solid lubricating substance besides the fluorine grease and the silicone oil is contained in the fixing device, according to the embodiments of the present disclosure, the temperature rise of the belt holder is reduced, and the temperature rise of the lubricating substance adhering to the belt holder is also reduced. Thus, the generation of the FP/UFP is effectively reduced.

The "temperature of the belt holder during 10 minutes of continuous printing" is the temperature of the belt holder measured by the following procedure. In the temperature measurement procedure, first, an image forming apparatus including a fixing device OF heating device) is installed in a measurement room in an environment of 23° C. After the power of the image forming apparatus is turned on to start up the image forming apparatus and the image forming apparatus shifts to an energy-saving state, the door of the measurement room is closed. The printing is instructed after a lapse of time (for example, 60 minutes) during which the measurement room is sufficiently ventilated. Then, the temperature of the belt holder is measured for 10 minutes with the time when the first sheet is ejected as the start of printing.

Aspects of the present disclosure are, for example, as follows.

First Aspect

In a first aspect, a heating device includes a rotator, a heater, a rotator holder, lubricant, and a shield. The heater heats the rotator in a heat generation range. The rotator holder holds an end of the rotator in a longitudinal direction of the rotator. The lubricant adheres to the rotator holder. The shield shields heat transferred from the heater. The shield includes a first a second shield, and a heat transfer reducer. The first shield faces the heater and the rotator. The second shield faces the rotator holder. The second shield is outside the heat generation range in the longitudinal direction. The heat transfer reducer is disposed between the first shield and the second shield. The heat transfer reducer reduces the heat transferred from the first shield to the second shield.

Second Aspect

In a second aspect, the heat transfer reducer in the heating device according to the first aspect has a gap between the first shield and the second shield.

Third Aspect

In a third aspect, the heat transfer reducer in the heating device according to the first aspect includes a thermal insulator having a thermal conductivity lower than a thermal conductivity of the first shield.

Fourth Aspect

In a fourth aspect, the first shield in the heating device according to the second aspect is separated from the second shield.

Fifth Aspect

In a fifth aspect, the first shield in the heating device according to fourth aspect is separated from the second shield in the longitudinal direction with the gap.

Sixth Aspect

In a sixth aspect, the first shield in the heating device according to any one of the first to fifth aspects is closer to the heater than the second shield in a direction orthogonal to the longitudinal direction.

Seventh Aspect

In a seventh aspect, the second shield in the heating device according to any one of the first to fifth aspects is closer to the heater than the first shield in a direction orthogonal to the longitudinal direction.

Eighth Aspect

In an eighth aspect, the heating device according to any one of the first to seventh aspects further includes another first shield disposed between the first shield and the rotator in a direction orthogonal to the longitudinal direction.

Ninth Aspect

In a ninth aspect, said another first shield in the heating device according to the eighth aspect is thinner than the first shield.

Tenth Aspect

In a tenth aspect, the heating device according to any one of the first to eighth aspects further includes another second shield between the second shield and the rotator holder in a direction orthogonal to the longitudinal direction.

Eleventh Aspect

In an eleventh aspect, said another second shield in the heating device according to the tenth aspect is thinner than the second shield.

Twelfth Aspect

In a twelfth aspect, an end part of the first shield is overlapped with an end part of the second shield in a direction orthogonal to the longitudinal direction in the heating device according to the fourth aspect.

Thirteenth Aspect

In a thirteenth aspect, the heat transfer reducer in the heating device according to the first aspect has a connecting portion connecting the first shield to the second shield in the longitudinal direction and a slit at a position corresponding to the connection portion in the longitudinal direction to divide the shield into the first shield and the second shield.

Fourteenth Aspect

In a fourteenth aspect, a fixing device includes the heating device of any one of the first to thirteenth aspects.

Fifteenth Aspect

In a fifteenth aspect, an image forming apparatus includes the fixing device according to the fourteenth aspect.

The above-described embodiments are illustrative and do not limit the present invention. Thus, numerous additional modifications and variations are possible in light of the above teachings. For example, elements andiron features of different illustrative embodiments may be combined with each other and/or substituted for each other within the scope of the present invention.

The invention claimed is:

1. A heating device comprising:
- a rotator;
- a heater to heat the rotator in a heat generation range;
- a rotator holder holding an end of the rotator in a longitudinal direction of the rotator;
- lubricant adhering to the rotator holder; and
- a shield to shield heat transferred from the heater, the shield including:
  - a first shield facing the heater and the rotator;
  - a second shield facing the rotator holder, the second shield being outside the heat generation range in the longitudinal direction; and
  - a heat transfer reducer between the first shield and the second shield, the heat transfer reducer configured to reduce the heat transferred from the first shield to the second shield, wherein:
- the heat transfer reducer has a gap between the first shield and the second shield,
- the first shield is separated from the second shield,
- the first shield is separated from the second shield in the longitudinal direction with the gap, and
- the first shield is closer to the heater than the second shield in a direction orthogonal to the longitudinal direction.

2. The heating device according to claim 1, wherein the heat transfer reducer includes a thermal insulator having a thermal conductivity lower than a thermal conductivity of the first shield.

3. The heating device according to claim 1, wherein the second shield is closer to the heater than the first shield in the direction orthogonal to the longitudinal direction.

4. The heating device according to claim 1, further comprising:

another first shield disposed between the first shield and the rotator in the direction orthogonal to the longitudinal direction.

5. The heating device according to claim 1, further comprising;

another second shield between the second shield and the rotator holder in the direction orthogonal to the longitudinal direction.

6. The heating device according to claim 1, wherein an end part of the first shield is overlapped with an end part of the second shield in the direction orthogonal to the longitudinal direction.

7. The heating device according to claim 1, wherein the heat transfer reducer has:
- a connecting portion connecting the first shield to the second shield in the longitudinal direction; and
- a slit at a position corresponding to the connection portion in the longitudinal direction to divide the shield into the first shield and the second shield.

8. A fixing device comprising:

the heating device according to claim 1.

9. An image forming apparatus comprising:

the fixing device according to claim 8.

10. A heating device, comprising:

a rotator;

a heater to heat the rotator in a heat generation range;

a rotator holder holding an end of the rotator in a longitudinal direction of the rotator;

lubricant adhering to the rotator holder;

a shield to shield heat transferred from the heater, the shield including:

a first shield facing the heater and the rotator;

a second shield facing the rotator holder, the second shield being outside the heat generation range in the longitudinal direction; and a heat transfer reducer between the first shield and the second shield, the heat transfer reducer configured to reduce the heat transferred from the first shield to the second shield; and another first shield disposed between the first shield and the rotator in a direction orthogonal to the longitudinal direction, wherein said another first shield is thinner than the first shield.

11. The heating device according to claim 10, wherein the heat transfer reducer includes a thermal insulator having a thermal conductivity lower than a thermal conductivity of the first shield.

12. The heating device according to claim 10, wherein the heat transfer reducer has:

a connecting portion connecting the first shield to the second shield in the longitudinal direction; and a slit at a position corresponding to the connection portion in the longitudinal direction to divide the shield into the first shield and the second shield.

13. A fixing device comprising:

the heating device according to claim 10.

14. An image forming apparatus comprising:

the fixing device according to claim 13.

15. A heating device comprising:

a rotator:

a heater to heat the rotator in a heat generation range:

a rotator holder holding an end of the rotator in a longitudinal direction of the rotator;

lubricant adhering to the rotator holder:

a shield to shield heat transferred from the heater, the shield including:

a first shield facing the heater and the rotator;

a second shield facing the rotator holder, the second shield being outside the heat generation range in the longitudinal direction; and a heat transfer reducer between the first shield and the second shield, the heat transfer reducer configured to reduce the heat transferred from the first shield to the second shield; and another second shield between the second shield and the rotator holder in a direction orthogonal to the longitudinal direction, wherein said another second shield is thinner than the second shield.

16. The heating device according to claim 15, wherein the heat transfer reducer includes a thermal insulator having a thermal conductivity lower than a thermal conductivity of the first shield.

17. The heating device according to claim 15, wherein the heat transfer reducer has:

a connecting portion connecting the first shield to the second shield in the longitudinal direction; and a slit at a position corresponding to the connection portion in the longitudinal direction to divide the shield into the first shield and the second shield.

18. A fixing device comprising:

the heating device according to claim 15.

19. An image forming apparatus comprising:

the fixing device according to claim 18.

* * * * *